(12) United States Patent
Dezé et al.

(10) Patent No.: US 9,326,459 B2
(45) Date of Patent: May 3, 2016

(54) MACHINE FOR AUTOMATICALLY PULLING OUT THE CUT-OFF VINE BRANCHES

(76) Inventors: Jean-Yves Dezé, Souzay-Champigny (FR); Didier Andelfinger, Colmar (FR)

(*) Notice: Subject to any disclaimer, the term of this patent is extended or adjusted under 35 U.S.C. 154(b) by 95 days.

(21) Appl. No.: 14/126,149

(22) PCT Filed: Jun. 20, 2012

(86) PCT No.: PCT/EP2012/061846
§ 371 (c)(1),
(2), (4) Date: Dec. 13, 2013

(87) PCT Pub. No.: WO2012/175560
PCT Pub. Date: Dec. 27, 2012

(65) Prior Publication Data
US 2014/0124605 A1    May 8, 2014

(30) Foreign Application Priority Data
Jun. 20, 2011 (FR) ...................... 11 55416

(51) Int. Cl.
*A01G 3/04* (2006.01)
*A01G 17/02* (2006.01)
*A01G 3/08* (2006.01)

(52) U.S. Cl.
CPC .............. *A01G 17/02* (2013.01); *A01G 3/0408* (2013.01); *A01G 3/08* (2013.01); *A01G 17/026* (2013.01)

(58) Field of Classification Search
CPC ... A01G 3/0408; A01G 17/02; A01G 17/023; A01G 17/026; A01G 17/00
USPC .................................................. 56/234, 235
See application file for complete search history.

(56) References Cited

U.S. PATENT DOCUMENTS

| 53,033 | A | * | 3/1866 | Oliver | 56/235 |
| 3,222,852 | A | * | 12/1965 | Ward et al. | 56/104 |

(Continued)

FOREIGN PATENT DOCUMENTS

| DE | 102011106181 A1 | * | 1/2013 | A01G 17/02 |
| DE | 102013219651 B3 | * | 11/2014 | A01G 3/04 |

(Continued)

OTHER PUBLICATIONS

International Search Report and Written Opinion issued in corresponding International Patent Application No. PCT/EP2012/061846.

(Continued)

*Primary Examiner* — Árpád Fábián-Kovács
(74) *Attorney, Agent, or Firm* — Ostrolenk Faber LLP

(57) ABSTRACT

A machine for pulling out the cut-off vine branches (S) that are hanging on a tying wire (F), including a supporting frame (1), a gantry (2) comprising an arm set mounting so as to swivel and having an overhanging end, a gripping device (3) for the cut branches (S) including at least one gripping disk (23) connected to the overhanging end and showing notches (24) for gripping and dragging along the cut branches (S), a transfer device (4) comprising a transfer element (28) showing notches for gripping and dragging along the cut branches (S) gripped by gripping disk (23), and a detaching device (5) for the cut branches (S) arranged at the outlet of transfer device (4) and including a device for capturing the cut branches (S) and pulling them in the direction opposite to transfer device (4).

20 Claims, 23 Drawing Sheets

(56) References Cited

U.S. PATENT DOCUMENTS

| | | | | |
|---|---|---|---|---|
| 4,733,525 | A | * | 3/1988 | Pellenc et al. ............... 56/503 |
| 6,250,056 | B1 | * | 6/2001 | Spagnolo .................... 56/235 |
| 6,374,538 | B1 | * | 4/2002 | Morris et al. ........... 47/58.1 FV |
| 6,523,337 | B2 | * | 2/2003 | Spagnolo .................... 56/234 |
| 7,652,766 | B2 | * | 1/2010 | Pellenc .................... 356/432 |
| 8,230,671 | B2 | * | 7/2012 | Pellenc et al. ............... 56/235 |
| 2002/0043061 | A1 | | 4/2002 | Spagnolo |
| 2006/0162309 | A1 | * | 7/2006 | Schloesser ................... 56/255 |
| 2009/0090093 | A1 | * | 4/2009 | Pellenc .................. 56/10.2 E |
| 2010/0218475 | A1 | * | 9/2010 | Langlois .................... 56/153 |
| 2010/0281770 | A1 | * | 11/2010 | George et al. ............... 47/1.43 |
| 2014/0000232 | A1 | * | 1/2014 | Andros et al. ............... 56/235 |

FOREIGN PATENT DOCUMENTS

| | | | | |
|---|---|---|---|---|
| DE | 102013213623 A1 | * | 1/2015 | ............ A01G 17/02 |
| EP | 2 057 893 | | 5/2009 | |
| EP | 2486787 A1 | * | 8/2012 | ............ A01G 17/02 |
| FR | 2 799 931 | | 4/2001 | |
| FR | 2976768 A1 | * | 12/2012 | ............... A01G 3/08 |
| WO | WO 2009/022915 | | 2/2009 | |
| WO | WO 2009051498 A2 | * | 4/2009 | ............ A01G 17/02 |

OTHER PUBLICATIONS

International Preliminary Report on Patentability and the Written Opinion of the International Searching Authority with a date of issuance of Dec. 23, 2013 issued in corresponding PCT International Application No. PCT/EP2012/061846 with English translation (7 pages).

* cited by examiner

MACHINE FOR AUTOMATICALLY PULLING OUT THE CUT-OFF VINE BRANCHES

CROSS REFERENCE TO RELATED APPLICATIONS

The present application is a 35 U.S.C. §371 National Phase conversion of PCT/EP2012/061846, filed Jun. 20, 2012, which claims benefit of French Application No. 1155416, filed Jun. 20, 2011, the disclosure of which is incorporated herein by reference. The PCT International Application was published in the French language.

TECHNICAL FIELD OF THE INVENTION

The present invention relates in general to the vine-growing area and, more particularly, to the specific operation consisting in pulling out the cut-off vine branches.

BACKGROUND OF THE INVENTION

The annual vine cultivation cycle begins with the pruning, which consists in cutting the vine-wood branches to leave only one long fruit-bearing branch per vine plant.

Vine posts are generally located along the vine rows and are connected by means of one or two steel wires called tying wires, to which the branches hang on during their growth by forming tendrils.

So, after the pruning operation, the branches, that is to say the cut-off branches and the long fruit-bearing branch, remain hanging on the tying wires.

It is therefore necessary to detach, or to "pull off", the cut-off branches, which is presently made manually by the pruner.

This operation is extremely tedious and costly in terms of labor, so that there is a need for a machine that would allow pulling out automatically the cut-off vine branches.

SUMMARY OF THE INVENTION

The present invention aims to offer such a machine and relates to a machine for automatically pulling out the cut-off vine branches that are hanging by their tendrils on a tying wire that connects vertical posts installed along a row of vine plants carrying each a long fruit-bearing branch.

Such a machine automatically pulls out the cut-off vine branches that are hanging by their tendrils on a tying wire that connects vertical posts installed along a row of vine plants carrying each a long fruit-bearing branch. The machine includes:
- a device for gripping the branches including an element that rotates around a vertical shaft, extends on an horizontal plane and shows on its circumferential surface notches for gripping and dragging along the cut-off branches;
- a transfer device including a transfer element showing transfer notches, while the projection of the trajectory of the notches in the horizontal plane cuts the projection of the trajectory of the gripping notches at an inlet of the transfer device, making the transfer device capable of removing the branches from the gripping notches and dragging them along to an outlet of the transfer device; and
- a device for detaching the cut-off branches including means for capturing the cut-off branches able to exert a traction force generally higher than the resistance of the tendrils that attach the cut-off branches to the tying wires, the trajectory of the notches of the transfer device extending in a space reaching from the closest to the detaching means up to overrunning the latter, in order to make the means for capturing able to catch a branch dragged along by the transfer device, where the notches are formed so that the unpruned fruit-bearing branch is not torn off the vine and preserved.

Preferred embodiments of the machine include the following features.

The rotating element of the machine comprises at least one gripping disk comprising on its periphery notches that are delimited by teeth able to drag along cut-off branches.

The gripping disk of the machine is arranged so as to allow it a movement under the influence of a return element, giving it the ability to move around a post.

The transfer device of the machine includes:
- at least one wheel comprising notches on its periphery, the wheel being driven in the direction opposite to that of gripping disk at the intersection point with the latter; or
- a movement transmission means provided with claws, the movement transmission means being driven in the direction opposite to that of the gripping disk at the intersection point with the latter.

The detaching device includes two rotary bodies in contact with each other, this contact area forming the section capable of exerting the traction force, the rotary bodies being driven in rotation so that their surfaces in the contact area move at the same speed and in the same direction, and in that a driving wheel is integrated in one of the two rotary bodies, around which the movement transmission means of the transfer device extends in order to drive it.

The movement transmission means of the transfer device is a chain carrying claws.

A guiding device is provided above and/or below the transfer device, forming an inclined surface in order to achieve a funnel effect for the branches dragged along by the transfer device.

Other preferred embodiments are:

The machine is intended for being coupled to the front of an agricultural vehicle and is characterized in that in comprises:
- a supporting frame equipped with means for attaching it to the tractor and extending in longitudinal and transversal directions that correspond, once the supporting frame is attached to the agricultural vehicle, respectively to the direction along which the vine row extends and to the direction transversal to the latter;
- a gantry attached to the supporting frame and including an arm set mounted so as to pivot about the supporting frame and an overhanging end region of the latter, in the transversal direction; a device for gripping the cut-off branches and the long fruit-bearing branches comprising:
  - a vertical drive shaft rotatably connected to the overhanging end region of the gantry, at least one gripping disk fixedly mounted on the drive shaft and showing on its circumferential surface notches for gripping and dragging along cut-off branches and long fruit-bearing branches, and
  - a motor connected to the drive shaft and intended for driving it in rotation in the direction that brings back the cut-off branches and the long fruit-bearing branches gripped by the gripping disk(s) towards the supporting frame;
- a transfer device for the cut-off branches, comprising;
- a transfer element rotatably connected to the supporting frame and showing on its outside notches for gripping and dragging along the previously cut branches gripped by the gripping disk(s), while the projection of the trajectory of the notches of the transfer element on an horizontal plane cuts the projection of the trajectory of the notches of the gripping disk(s) on the same horizontal plane at the inlet of the transfer device, and means for driving the transfer element in rotation, arranged so as to rotate it in the direction of rotation opposite to that of the gripping disks;

and device for detaching the cut branches arranged at the outlet of the transfer device and including means for capturing the cut branches and pulling them in the direction opposite to the transfer device, with a traction force higher than the resistance of the tendrils that attach the cut branches to the tying wire.

As the agricultural vehicle advances along a vine row and the gripping device is in its normal operating position, that is to say the position in which the gripping disk(s) is(are) overhanging from the supporting frame on a distance such that their notches can grip the branches hanging on the tying wires, the branches are gripped by the gripping disk(s), dragged along towards the agricultural vehicle and the supporting frame until the notches in which the branches are gripped align with notches of the transfer element, which is the moment when the branches are released from the gripping disk(s) by the notches of the transfer element, then the cut branches are dragged by the transfer element towards the detaching device, while the long fruit-bearing branch slides on the transfer element to free itself from it. The fact that the cut-off branches are caught and dragged from the side allows providing only one cut per branch when pruning.

In particular, the overhang of the arm set of the gantry can be so that, in normal operating position, the rotational axis of the gripping disk(s) is shifted away from the tying wires in the transversal direction, the shift distance being so that a section of the gripping disk(s) extends on the side, with respect to the tying wires, where the agricultural vehicle is located.

The gantry can moreover comprise means for controlling the swiveling of the arm set, arranged to push permanently the arm set in the direction that brings the arm set back to the normal operating position of the gripping device.

The gripping device can comprise two gripping disks distant from each other, a section of the transfer element extending between the two gripping disks.

The fact of providing two disks has the advantage of better guiding the branches in order to keep them in vertical position while they tend to slide horizontally.

The notches in the gripping disk(s) are preferably regularly distributed on the circumferential surface of the or of each gripping disk.

The notches of the gripping disk(s) can have different shapes, for example a U-shape.

The notches of the gripping disk(s) have preferably a cylindrical bottom, whose radius is advantageously 3.5 cm. The thickness of the gripping disks is selected so as to obtain a contact surface between the gripping disks and the branches that is sufficiently large for the branches to be gripped by the notches while avoiding cutting the small twigs that would otherwise fall underneath the vine row and would therefore not be ground by a shredder carried by the agricultural vehicle.

The thickness of the gripping disks lies advantageously in a range from 2 cm to 3 cm.

The transfer element can be made of a belt showing on its external surface projections or claws distributed along the length of the belt and spaced from each other so that the space between two consecutive projections forms a notch for gripping and dragging along the cut branches.

The drive means for rotating the belt can include a supporting plate attached to the supporting frame and extending transversally and overhanging from the latter, a drive wheel rotatably connected to the supporting plate in an end region of the latter in the transversal direction, a pulley rotatably connected to the supporting plate in the other end region of the latter in the transversal direction, and a motor intended for driving the drive wheel in rotation, the belt being placed with its internal side on the drive wheel and on the pulley.

As a variant, the transfer element can be made of a wheel with external toothing, the teeth being dimensioned so that the space between two successive teeth forms a notch for gripping and dragging along the cut branches.

The capture and traction means for the cut branches can preferably comprise: two wheel sets arranged at the outlet of the transfer device and rotatably carried by the supporting frame so that their rotation axes are parallel and preferably vertical, and that the circumferential surfaces of the two wheel sets are pressed against each other, and means for driving the wheel sets in rotation, arranged to make the latter turn in directions that are opposite and so that the wheel sets pull the captured cut branches between the circumferential surfaces of the two wheel sets to the side opposite to the transfer device.

Preferably, if the rotation axes of the wheel sets are vertical and if the wheel sets are arranged in the longitudinal direction of the supporting frame, the wheel set closest to the attaching means of the supporting frame on the agricultural vehicle can comprise two wheels distant from each other and whose circumferential surfaces are pressed against that of the other wheel set, the transfer element being arranged with respect to the supporting frame so that the transfer element extends in the space between the two wheels and that the cut branches leave the notches of the transfer element in the plane generated by the transversal direction of the supporting frame and the contact line between the two wheel sets.

Preferably, the circumferential surface of the wheel sets, if applicable of the wheels, is structured so as to improve the capture effect of the cut branches between the two wheel sets.

Tires are advantageously mounted on the wheels and their tread, which is compressible and is an example of a structured surface, forms the circumferential surface of the wheel sets.

The gantry comprises preferably a vertical gantry mast attached to the supporting frame, a first arm attached, perpendicularly to the upper part of the gantry mast and extending in the longitudinal direction of the supporting frame, on the side opposite to the transfer device and to the detaching device, a second arm attached to the first arm so as to swivel and extending in overhang from the supporting frame, and a means for controlling the swiveling of the second arm with respect to the first arm, the gripping device being attached to the end region of the second overhanging arm of the supporting frame.

Such a gantry configuration allows realizing an extremely compact machine and a gantry opening so that the agricultural vehicle, after having finished processing a vine row, can start processing the adjacent vine row after a simple turn, without additional driving maneuvers such as repeated reverse and forward movements.

The gantry arm set, if applicable the second arm, is preferably telescopic, in order to allow adjusting the distance of the overhang of its end with respect to the supporting frame. This allows adjusting the position of the gripping disks in function of the width of the vine row.

The supporting frame comprises preferably a tractor mounting plate, a vertical mast attached to the plate and a mobile frame including a vertical slide mounted so as to move vertically on the mast and a means for controlling the movement of the vertical slide, the gantry being attached to the mobile frame. The mobile frame can furthermore comprise at least one beam forming a slide attached horizontally to the vertical slide and in the transversal direction of the supporting frame, at least one horizontal slide mounted so as to move in the beam forming a slideway and a means for controlling the movement of the horizontal slide, the gantry, the transfer device and the detaching device being attached to the horizontal slide.

Providing a frame that is movable vertically and/or horizontally allows obtaining the best positioning of the gripping disks, in function of the height and width of the vine row to process.

A sheet metal guide is preferably attached to the supporting frame, if applicable to the or to an horizontal slide, and extends downwards and opposite to the supporting frame, the sheet metal guide serving as a resting surface for the lower sections of the cut branches when they are dragged along by the gripping disks and the transfer element, to bend them upwards so as to release them from a tying wire that extends in the lower section of the posts.

The present invention also relates to an agricultural vehicle equipped with a machine as described above.

The agricultural vehicle is advantageously equipped with a shredder positioned so as to grind the cut branches lying on the ground.

BRIEF DESCRIPTION OF THE DRAWINGS

For a better illustration of the present invention, an embodiment will be described hereafter in reference to the attached drawings.

In these drawings.

DESCRIPTION OF PREFERRED EMBODIMENTS

Figure 1:
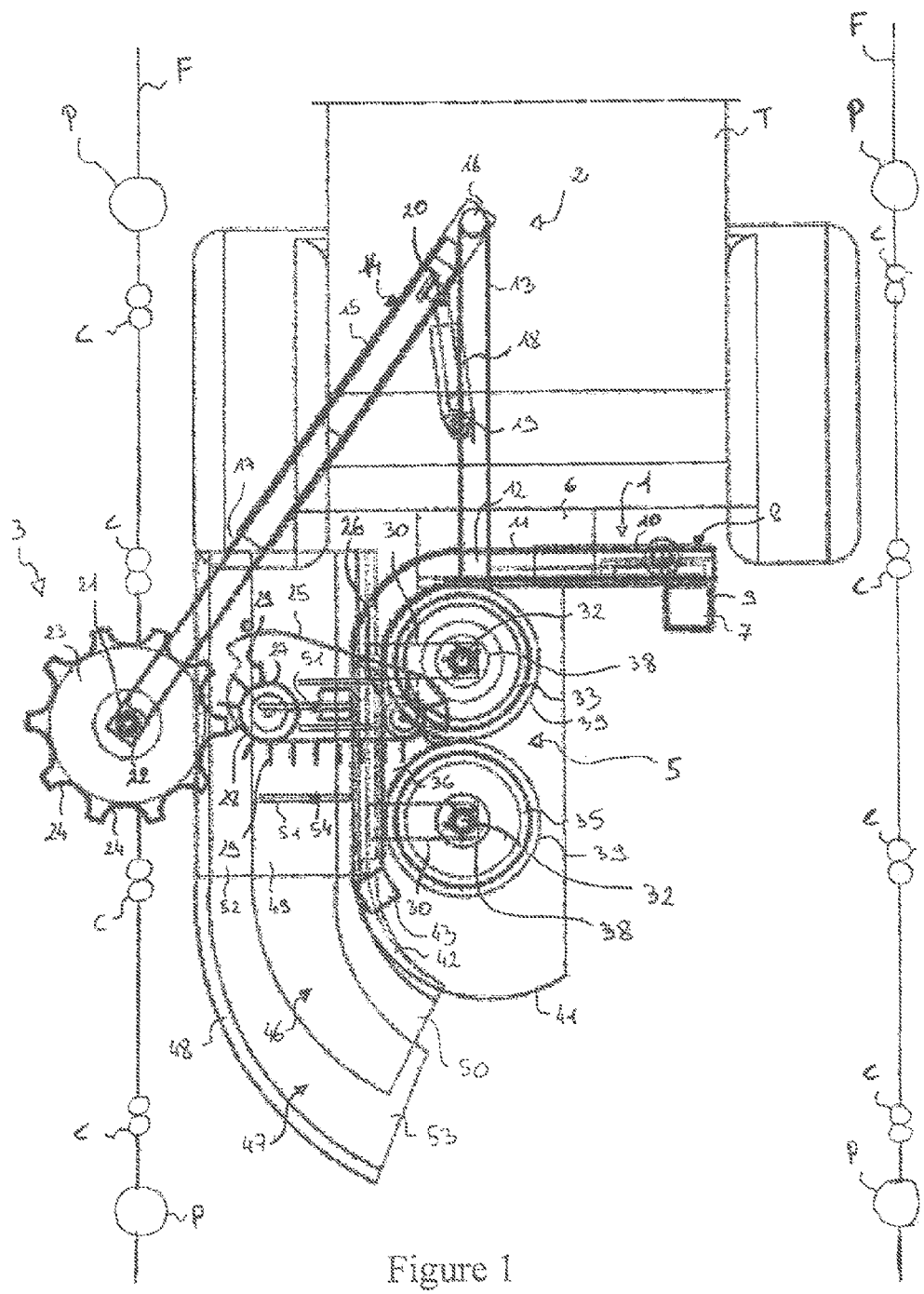
FIG. 1 is a top view of the front of a tractor circulating between two vine rows, the front of which is equipped with the machine according to the present invention.
Figure 2:
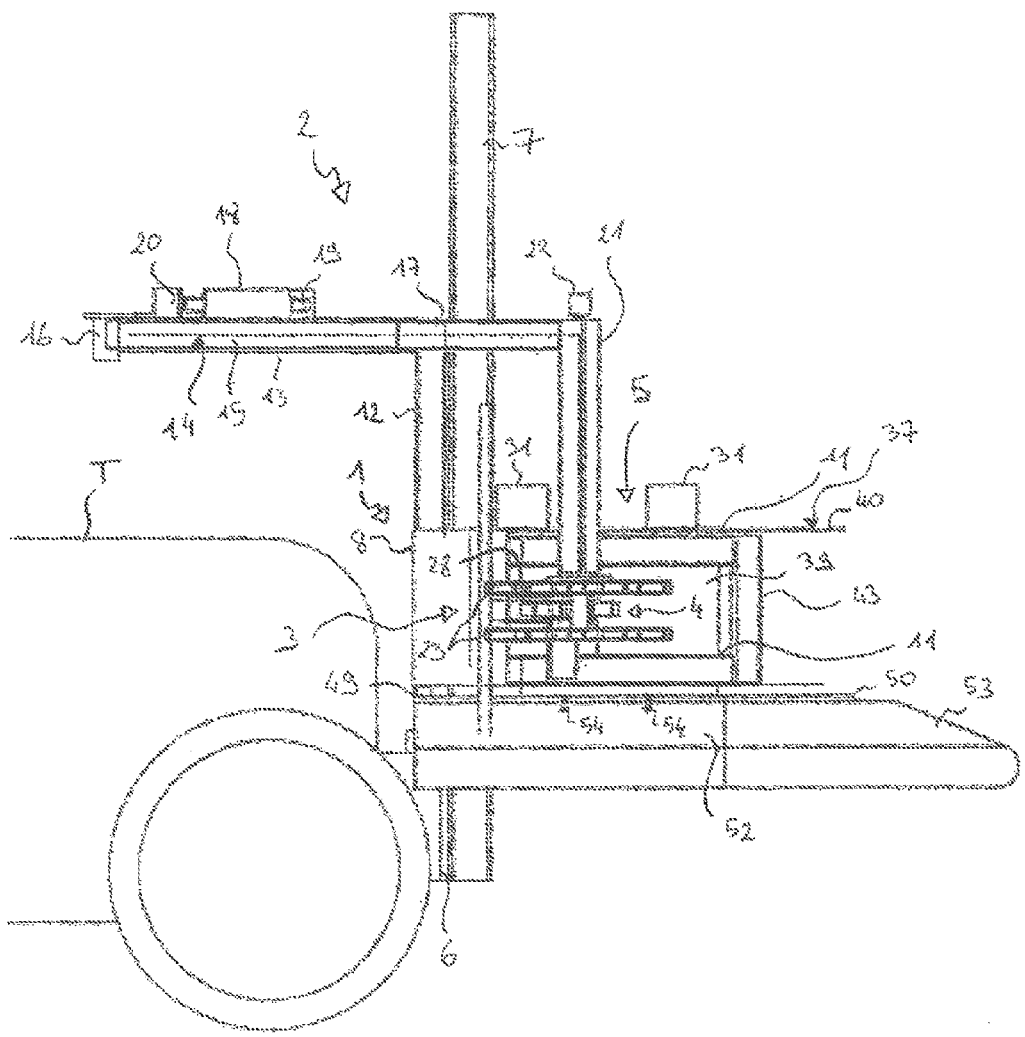
FIGS. 2, 3, 4 and 5 are views of the front of the tractor and of the machine according to the present invention, respectively from a first side, from the front, from the side opposite to the first side, and in top perspective view.
Figure 3:
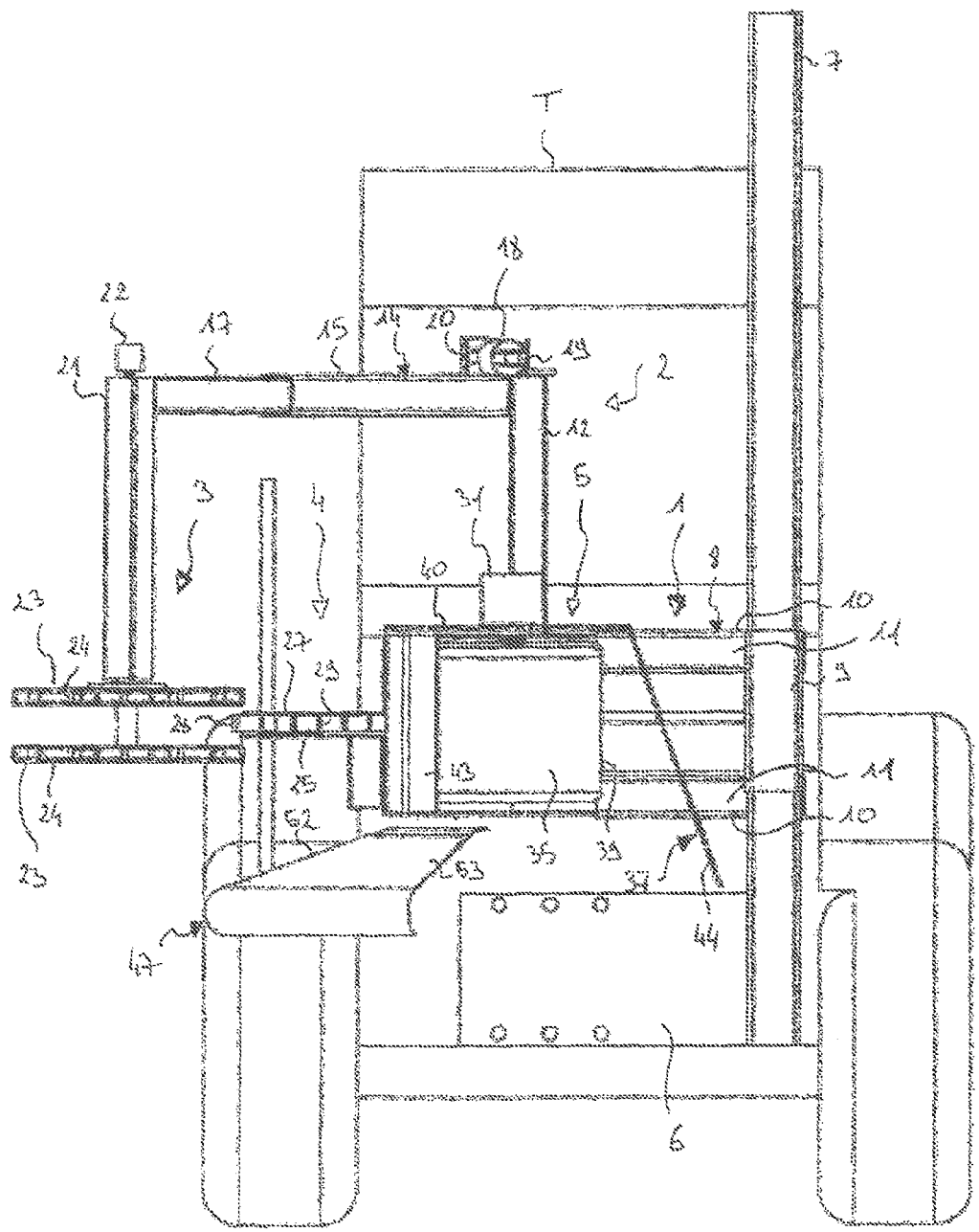
Figure 4:
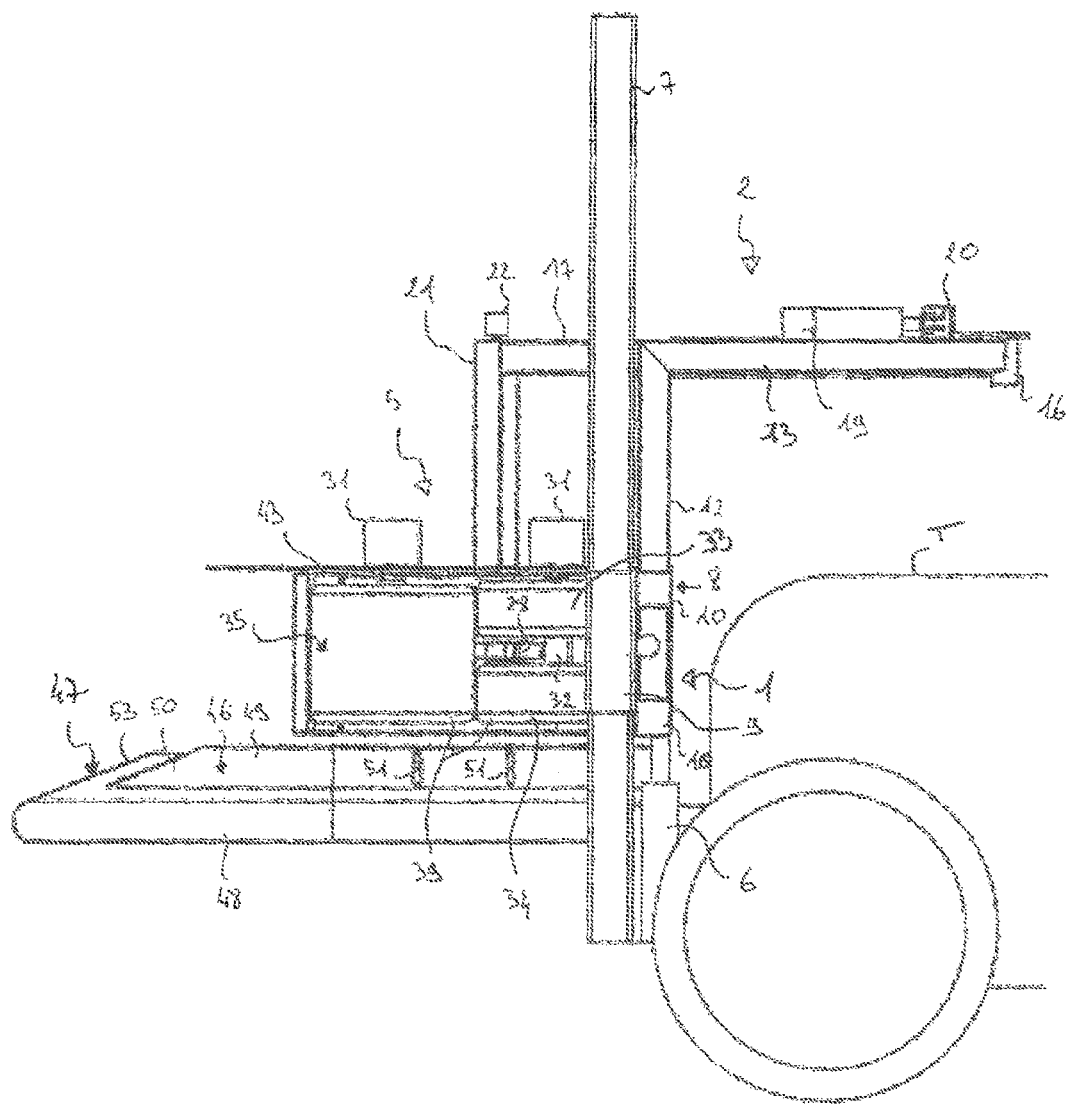
Figure 5:
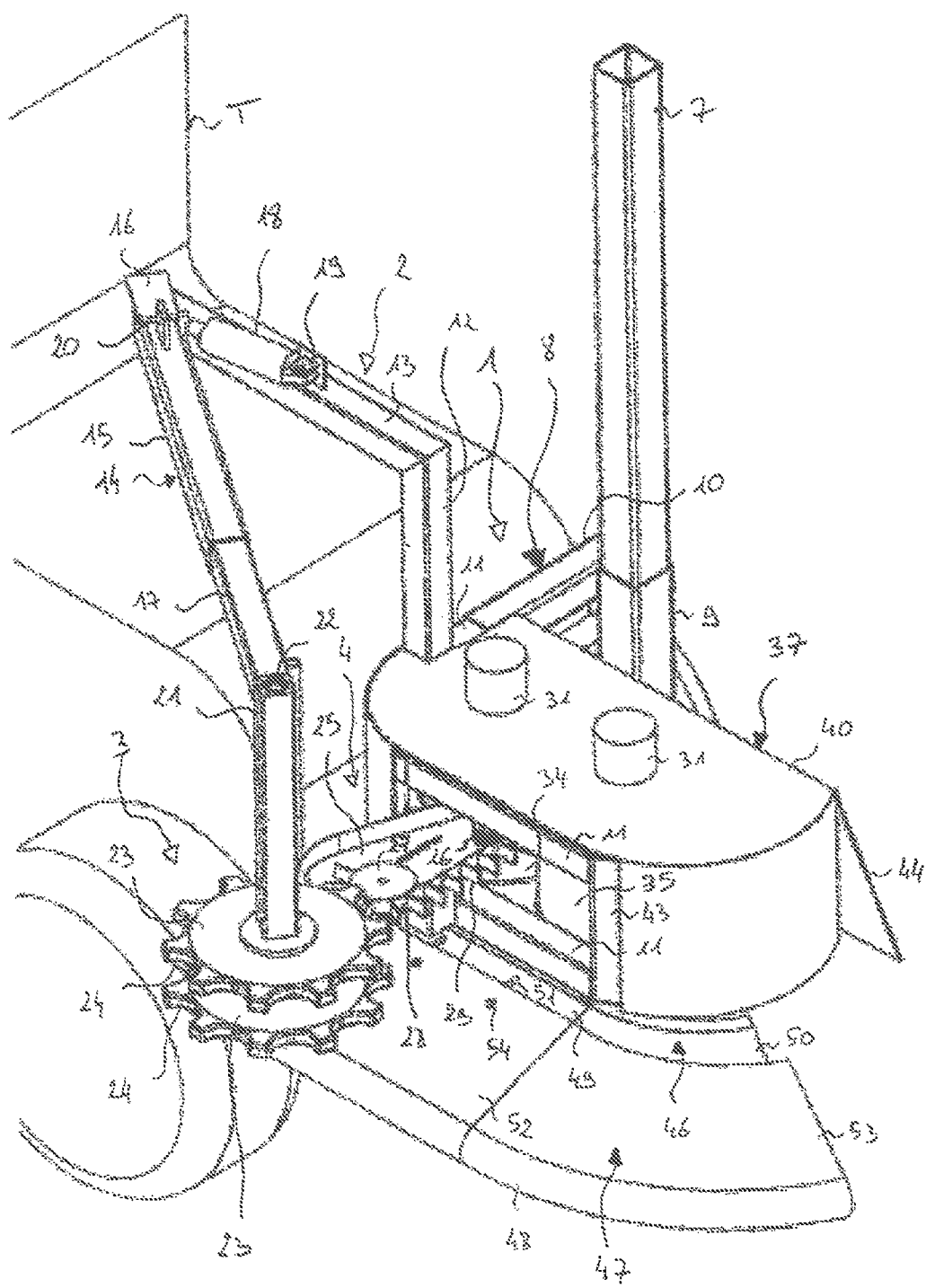

Referring to FIGS. 1 to 5, it can be seen that they represent the machine for pulling the branches according to a specific embodiment of the present invention, mounted on the front of a tractor T that moves between two vine rows formed each by a succession of vine plants C, a long fruit-bearing branch B extending from each of them (FIGS. 6 and following), posts P being planted at regular intervals, two tying wires F used for cultivating the vine extending between all of them, previously cut branches S (FIGS. 6 and following) hanging by their tendrils on the upper tying wire F.

In the following, the words "left" and "right" relate respectively to the left and the right when located at the driving position of tractor T, and the words "longitudinal" and "transversal" relate to the direction corresponding respectively to the longitudinal and transversal direction of tractor T. When tractor T is located between two vine rows, the longitudinal direction corresponds to the direction of the vine row.

The machine according to the present invention comprises mainly a supporting frame 1, a gantry 2, a device 3 for gripping the branches, a device 4 for transferring the cut-off branches and a device 5 for detaching (or extracting) the cut-off branches.

The supporting frame 1 comprises mainly a plate 6 screwed onto the front counterweight holder of tractor T, a vertical mast 7 attached to plate 6 and located on the left, and a mobile frame 8 carried by mast 7 so as to be able to move vertically along it.

The mobile frame 8 comprises mainly a vertical slide 9, two beams forming slideways 10 and two horizontal slides 11.

The vertical slide 9 has the shape of a hollow part having the same transversal cross-section as that of mast 7 and that is mounted on the latter in order to be able to slide vertically along it. A cylinder is provided and arranged to control the movement and the positioning of vertical slide 9 on mast 7.

The two beams forming the slideways 10 are hollow. They are firmly attached to vertical slide 9, one above the other, in order to move with it. They extend horizontally and in the transversal direction on a distance that is here smaller than the width of tractor T.

Each horizontal slide 11 has an L shape whose two rectilinear branches have here the same length and whose angle has been rounded. This L can be formed by one single beam that has been bent or by several beam segments assembled together, for example by welding. A first branch of each horizontal slide 11 is housed at least partially in a beam forming a slideway 10 so as to be able to slide in it. A cylinder is provided and arranged in order to control the movement and the positioning of each horizontal slide 11 in the respective beam 10 forming a slideway.

It can therefore be seen that frame 8 moves vertically as a single part thanks to the movement of vertical slide 9 along mast 7 and that a part of frame 8 is mobile horizontally in the transversal direction thanks to the movement of the horizontal slides 11 in the beams 10 forming slideways.

The gantry 2 includes mainly a gantry mast 12, a first arm 13 and a second arm 14.

The gantry mast 12 extends vertically from the upper horizontal slide 11, to which it is firmly attached close to the angle of the L, on the first branch, that is to say the one housed in the beam 10 forming a slideway.

The first arm 13 is attached perpendicularly to the upper end of gantry mast 12 and extends horizontally towards the rear of tractor T, in the longitudinal direction. The second arm 14 is telescopic and comprises a first arm segment 15, one end of which is connected by a pivoting link 16 to the free end of first arm 13, and a second arm segment 17 extending outside of the other end of first arm segment 15.

A cylinder 18 extends between first arm 13 and second arm 14, in the region in which they are connected together, the body of cylinder 18 being pivotally connected to first arm 13 at point 19, while the free end of the rod of cylinder 18 is pivotally connected to first arm segment 15 at point 20. So, the movement of the rod of cylinder 18 allows swiveling the second arm 14 away from or towards first arm 13, respectively opening or closing gantry 2. Cylinder 18 is set so that its rod is constantly subjected to a force in the direction bringing it back inside the body of cylinder 18, that is to say in the closing direction of gantry 2.

The device 3 for gripping the branches includes mainly a vertical beam 21, a drive shaft, a motor 22 and two gripping disks 23.

The vertical beam 21 is hollow and is attached at its upper section to the free end of second arm segment 17. The drive shaft extends vertically inside of beam 21 and is mounted there so as to be able to rotate by means of two bearings housed each at an end of vertical beam 21.

The drive shaft is driven in rotation around the vertical axis by motor 22, which is typically hydraulic and mounted on the free end of second arm segment 17.

The two gripping disks 23 are integrally connected to the drive shaft, in its lower section and one above the other, and thus turn on themselves in the counter-clockwise direction when the drive shaft is driven in rotation by motor 22.

The external circumferential surface of gripping disks 23 shows notches 24 with a cylindrical bottom that are regularly distributed on the circumferential surface. The radius of notches 24 is 3.5 cm.

The gripping disks 23 have a radius of 45 cm and a thickness of 2 to 3 cm.

The device 4 for transferring the cut-off branches comprises a supporting plate 25, a motor, a timing wheel 26, a timing pulley 27 and a transfer belt 28.

The supporting plate 25, whose edge on the side of tractor T has been perpendicularly bent, is attached to the second branch of upper horizontal slide 11, that is to say the one that extends in the longitudinal direction. In particular, supporting plate 25 extends between the second branches of the two horizontal slides 11, on either side of the vertical plane including these second branches.

The hydraulic or electrical motor, in particular hydraulic, is attached to supporting plate 25 and its output shaft drives timing wheel 26 in rotation, which is rotatably mounted on a vertical axis that is attached to supporting plate 25.

The timing pulley 27 is mounted free in rotation on a vertical axis attached to supporting plate 25.

The timing wheel 26 and the timing pulley 27 are arranged on either side of the vertical plane including the second branches of horizontal slides 11, timing wheel 26 being located on the side of mast 7 and timing pulley 27 being located on the side of gripping disks 23.

The transfer belt 28, with a width of 2 to 3 cm, has a timing belt shape on its internal surface and is mounted on timing wheel 26 and on timing pulley 27 so as to be driven in rotation when the motor drives timing wheel 26 in rotation.

The external surface of transfer belt 28 carries, spaced by 5 cm, projections 29 with a rectangular shape and extending on the whole width of transfer belt 28 and on a distance of 3.5 cm towards the outside. The projections 29 are made out of a substantially rigid material such as Nylon, steel.

It is emphasized here that supporting plate 25 is positioned so as to be placed at a vertical level located between the two gripping disks 23, and that timing pulley 27 is positioned so that, when they are projected in a same horizontal plane, the trajectory of the free ends of projections 29 intersects the trajectory of the free ends of notches 24 of the two gripping disks 23.

The device 5 for detaching the cut-off branches comprises mainly two brackets 30, two motors 31, two drive hafts 32, three wheels 33, 34, 35 (capture or gripping means), two canalizing metal sheets 36 and a protective cover 37.

The plates 30 have a rectangular shape and are firmly attached at one end to the top of the second branch of upper horizontal slide 11, at a distance of each other, and holes have been drilled in their free end region.

The motors 31, of the hydraulic type, are each attached to a bracket 30. The output shaft of a motor 31 extends vertically through the hole of the corresponding bracket 30 and is coupled with a drive shaft 32 that also extends vertically.

The hubs 38 of two first wheels 33, 34 are attached by bolting to the first drive shaft 32 that is located in the region of the angles of horizontal slides 11, and the hub 38 of third wheel 35 is attached by bolting to the second drive shaft 32.

The wheels 33 and 34 comprise each a tire 39, are arranged one above the other, without protruding above and below horizontal slides 11, and are separated from each other, creating a space located at a height corresponding to the height of transfer belt 28. The wheels 33 and 34 and timing wheel 26 are arranged so that, when they are projected in a same horizontal plane, the trajectory of the free ends of projections 29 intersects the external circumference of tires 39.

The wheel 35 comprises a tire 39 whose width is substantially equal to the distance between the upper wall of tire 39 of upper wheel 33 and the lower wall of tire 39 of lower wheel 34. As wheel 35 is arranged horizontally, the width of tire 39 therefore corresponds to the height on which it extends.

The brackets 30 are positioned and the diameter of wheels 33, 34 and 35 is chosen so that tires 39 of first and second wheels 33, 34 are in contact with tire 39 of third wheel 35 with a slight, compression between them.

A motor 31 drives first drive shaft 32 in counter-clockwise rotation while the other motor 31 drives second drive shaft 32 in clockwise rotation, so that tires 39 are counter-rotating.

The canalizing metal sheets 36 have a substantially triangular shape and are each attached along a straight edge in the middle, in the longitudinal direction, of the second branch of an horizontal slide 11, so that the two free edges, which are curved so that their curvature corresponds substantially to the radius of tires 39, is next to the tread of tires 39. In other words, the free edges of upper canalizing metal sheet 36 are located at a height slightly lower than the height of the upper wall of tires 39 of upper wheel 33 and of wheel 35 and the free edges of lower canalizing metal sheet 36 are located at a height slightly higher than the height of the lower wall of tires 39 of lower wheel 34 and wheel 35. Finally, the dimensions of canalizing metal sheets 36 are such that their free ends are located closely next to tires 39, but without touching them.

The wheels 33, 34, 35 are surrounded by protective cover 37 that is made of a rectangular flat metal sheet 40 attached along a first long side to the second branch of upper horizontal slide 11 so as to extend above tires 39, sheet 40 comprising openings for the passage of the output shafts of motors 31, two bent metal sheets 41 applied one against the curved sections of horizontal slides 11 and the other against two small curved beams 42 that extend from a leg 43 connecting the free ends of horizontal slides 11, and an inclined rectangular flat metal sheet 44, a long side of which is attached to the second long side of sheet 40.

The protective cover 37 therefore surrounds tires 39, leaving a downwards opening and a side opening between the two second branches of horizontal slides 11.

The machine according to the present invention furthermore comprises an external guiding device 45 including a supporting plate 46, a sheet metal guide 47 and a stiffening tube 48.

The supporting plate 46 includes a flat rectangular section 49 by which it is attached to the second branch of lower horizontal slide 11 and a curved section 50 attached to the above-mentioned lower prolongation.

Two through slots 51 are made in flat section 49 and extend in the transversal direction.

The sheet metal guide 47 follows the same shape as supporting plate 46 and also comprises a flat rectangular section 52 in which two through holes have been drilled, whose spacing corresponds to that of slots 51, and a curved section 53. The sheet metal guide 47 is attached in a removable way to supporting plate 46 by two bolts extending each in one of slots 51 and in a corresponding hole of flat section 52, and by two nuts 54 screwed on the bolts in order to tighten flat section 52 against flat section 49.

The stiffening tube 48 is attached to the lower edge of sheet metal guide 47 and serves to prevent a deformation of the latter.

Finally, a shredder is carried by the rear of tractor T.

The operation of the machine according to the present invention will now be described in reference to FIGS. 6 to 15, describing the various steps performed automatically by the machine for detaching the cut-off branches S of a vine plant C, while leaving intact its long fruit-bearing branch B. Metal sheet 44 is not represented on FIGS. 1, 9, 11, 13 and 15.

First of all, the position of gripping disks 23 must be adjusted in order to place them in the normal operating position. To do so, it is sufficient to adjust their height by moving mobile frame 8 along mast 7, and their position in the transversal direction by moving horizontal slides 11 in the beams forming the slideways 10 and by adjusting the extension of second arm segment 17 with respect to first arm segment 15.

The length of the beams forming the slideways 10 must be sufficient to allow a displacement of horizontal slides 11 in a range that will be sufficient to adapt the machine to the width of the vine row to be processed.

It must be noted here that the radius of the gripping disks is normally chosen according to the width of the vine row to be processed. A radius between 40 and 50 cm is suitable in most of the cases, considering the adjustment capacity provided by the mobile frame 8 and the second arm 14 of gantry 2.

Figure 6:
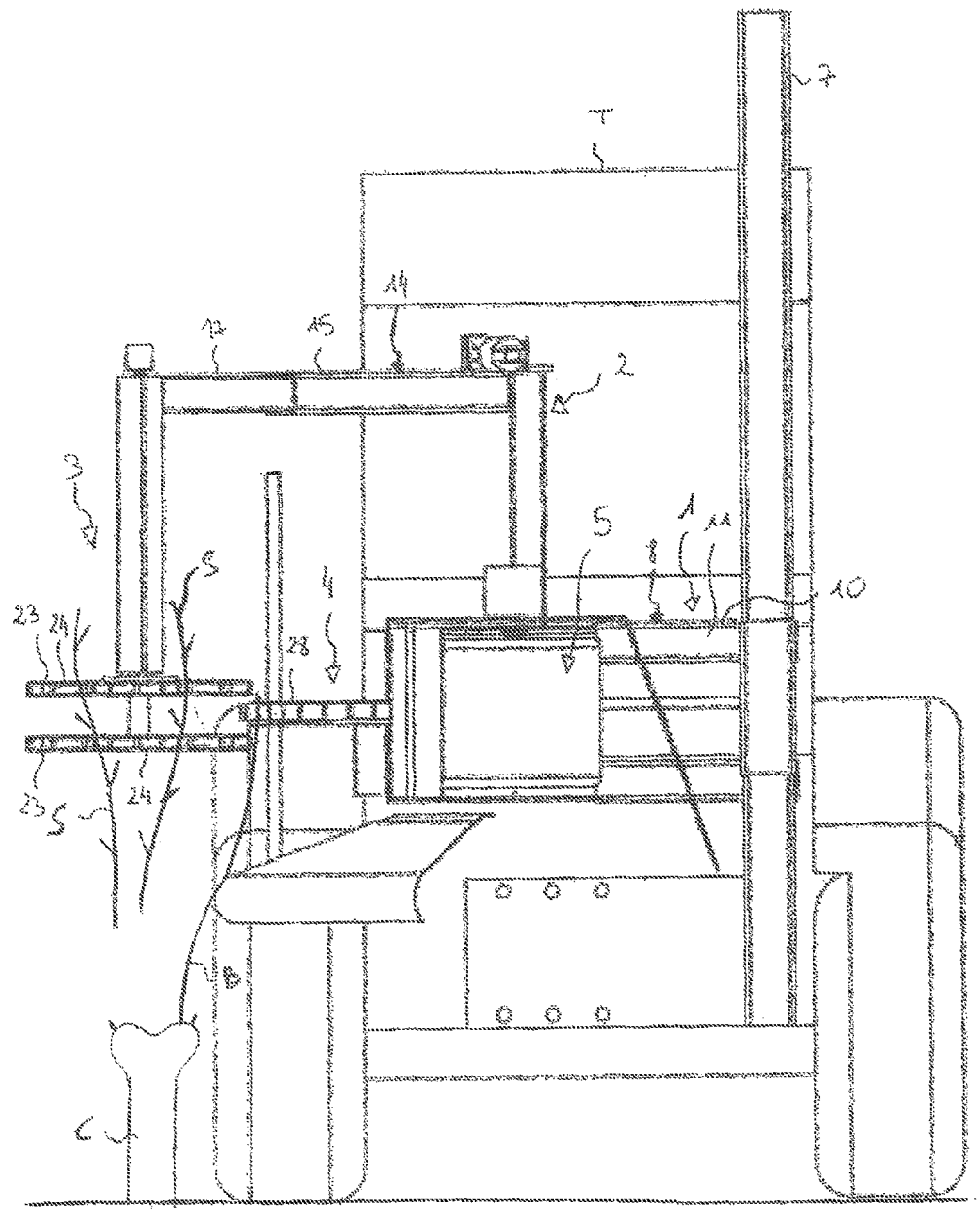
FIGS. 6 and 7 are front and side views of the front of the tractor and of the machine according to the present invention, showing the branches attached by their tendrils to the tying wires as they are gripped by the gripping disks.
Figure 7:
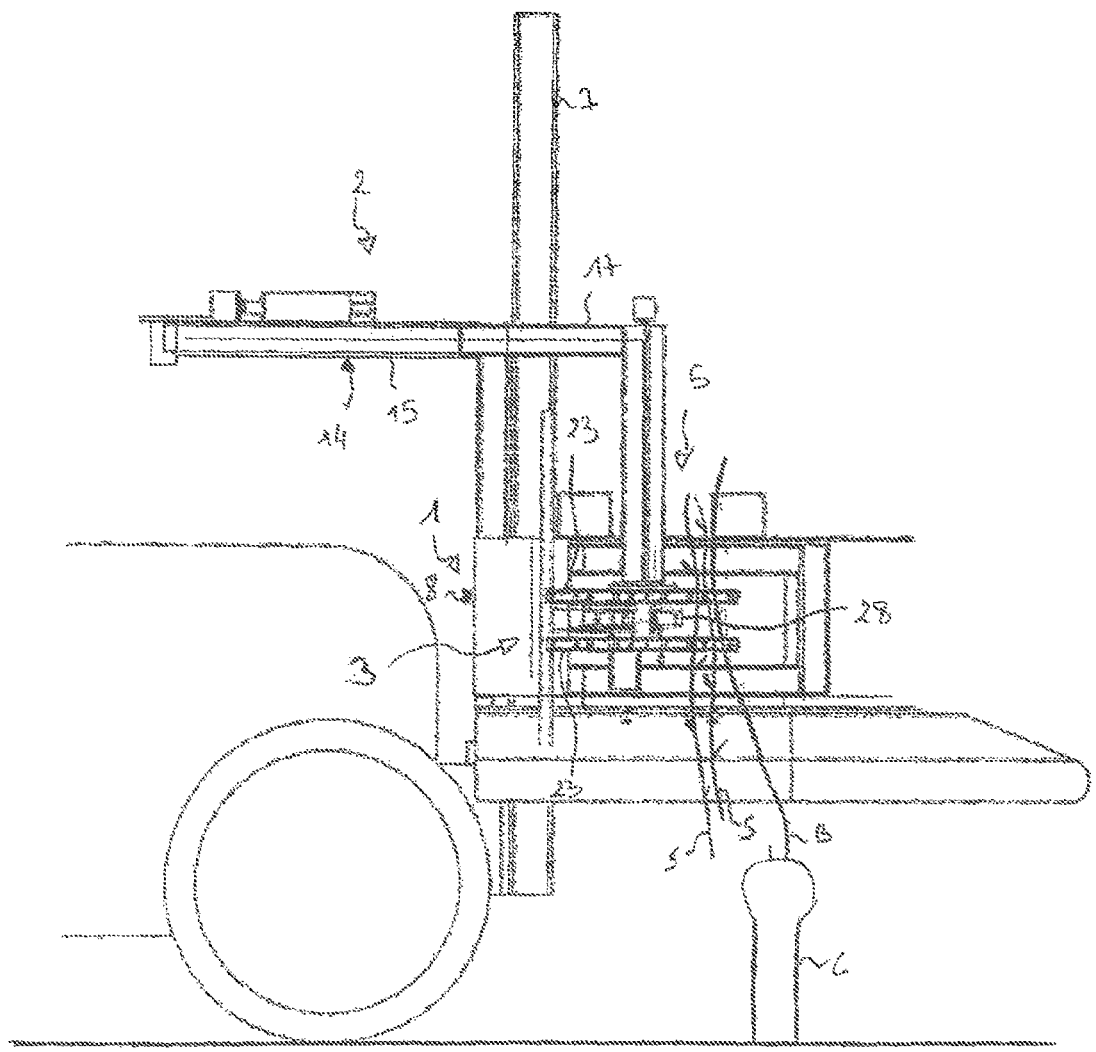

Referring first to FIGS. 6 and 7, it can be seen that the machine according to the present invention has been represented during the operation of gripping the branches, that is to say the cut-off branches S and the long fruit-bearing branch B.

As tractor T advances between the two vine rows and gripping disks 23, driven in rotation, come into contact with the branches, these are gripped in notches 24 and dragged along in these notches towards transfer belt 28, on at the most a quarter turn of gripping disks 23.

Figure 8:
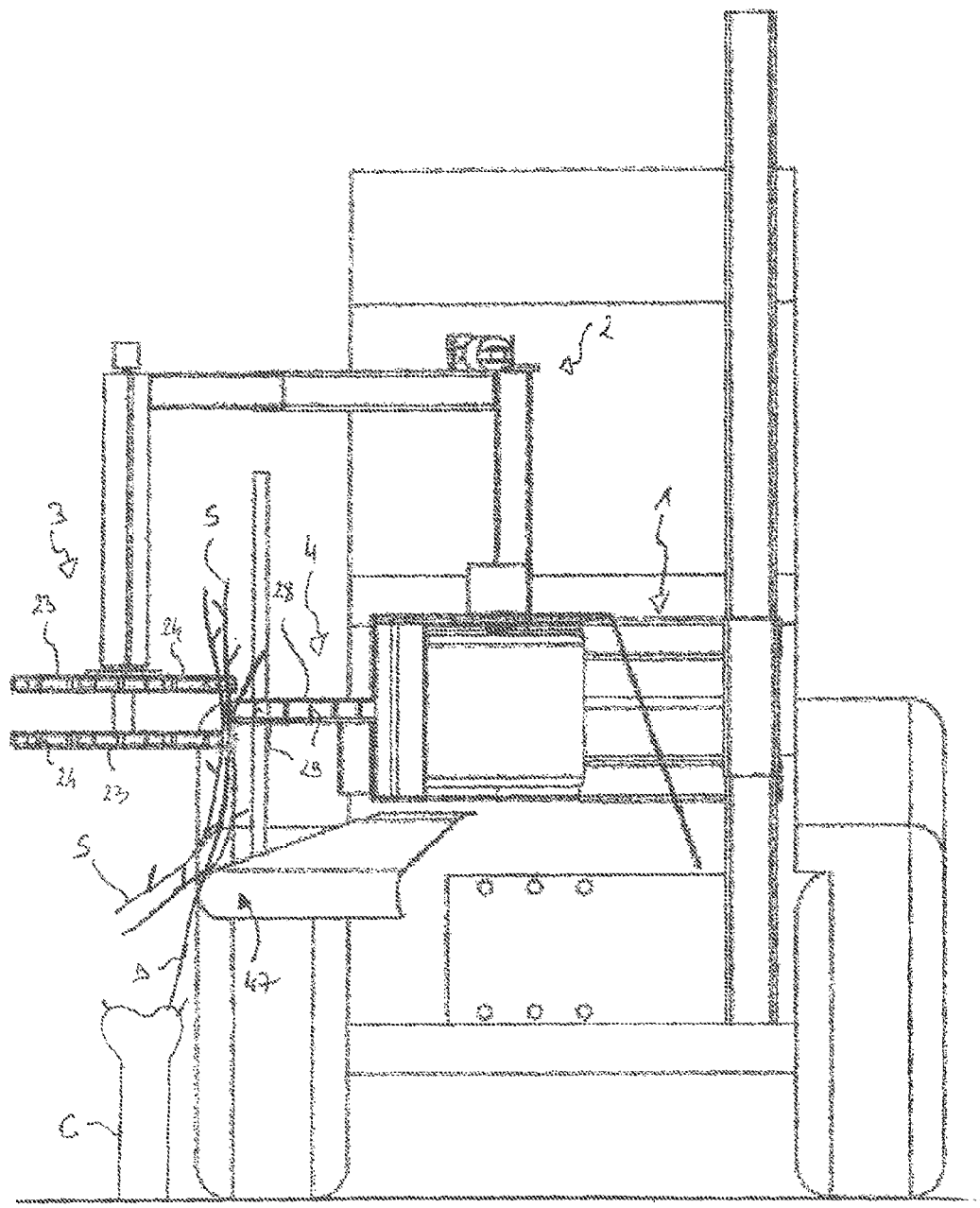
FIGS. 8 and 9 are views similar to FIGS. 6 and 7 showing the branches, still hanging on the tying wires, as they pass from the gripping disks to the transfer device.
Figure 9:
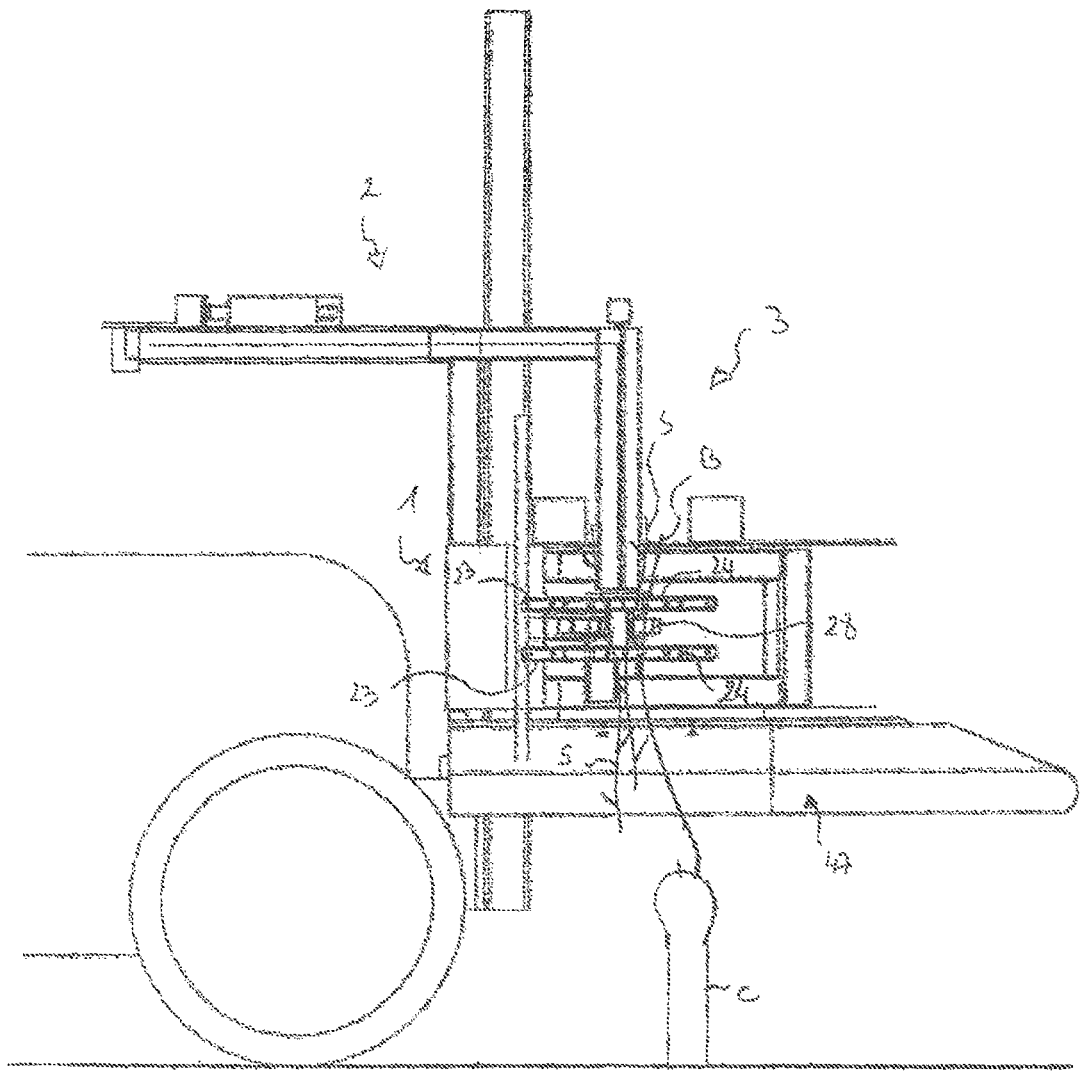

FIGS. 8 and 9 show the machine as the branches that have been gripped by notches 24 have been dragged along on about a quarter turn of gripping disks 23 and arrive in the zone where the trajectory of the circumferences of gripping disks 23 intersects the trajectory of the free ends of projections 29 of transfer belt 28, when the trajectories are projected on a same horizontal plane.

So, in this position, the notch 24 that is oriented towards transfer belt 28 is aligned vertically with at least one free space between two consecutive projections 29 of transfer belt 28, so that the branches extend at this exact moment both in a notch 24 and in the space between two consecutive projections 29.

It can also be noted that the lower section of the branches rests on the external surface of sheet metal guide 47 and bends upwards and outwards, which allows releasing the lower section of the branches from the (not represented) lower tying wire F.

The advantage of providing such sheet metal guide 47 and a lateral adjusting of the latter, which is achieved here by loosening nuts 54, moving sheet metal guide 47 with respect to supporting plate 46, guided by the bolts extending in slots 51 and in the holes of sheet metal guide 47, and tightening nuts 54 on bolts 55 once sheet metal guide 47 is at the right position in the transversal direction is emphasized here. This way, the position of sheet metal guide 47 can be optimized according to the vine row to be processed.

Since transfer belt 28 rotates in the direction opposite to that of gripping disks 23, the branches are removed from the notches and dragged along towards the opening between the two second branches of horizontal slides 11 by the projections 29 of transfer belt 28.

As gripping disks 23, the projections 29 are spaced from each other and dimensioned not only to avoid shearing the branches, but also to drag along the long fruit-bearing branch B, while letting it slide. In other words, the cut-off branches S and the long fruit-bearing branch B are not subjected to any traction force higher than the resistance of the tendrils of the cut-off branches S and of the contact point between long fruit-bearing branch B and vine plant C.

Figure 10:
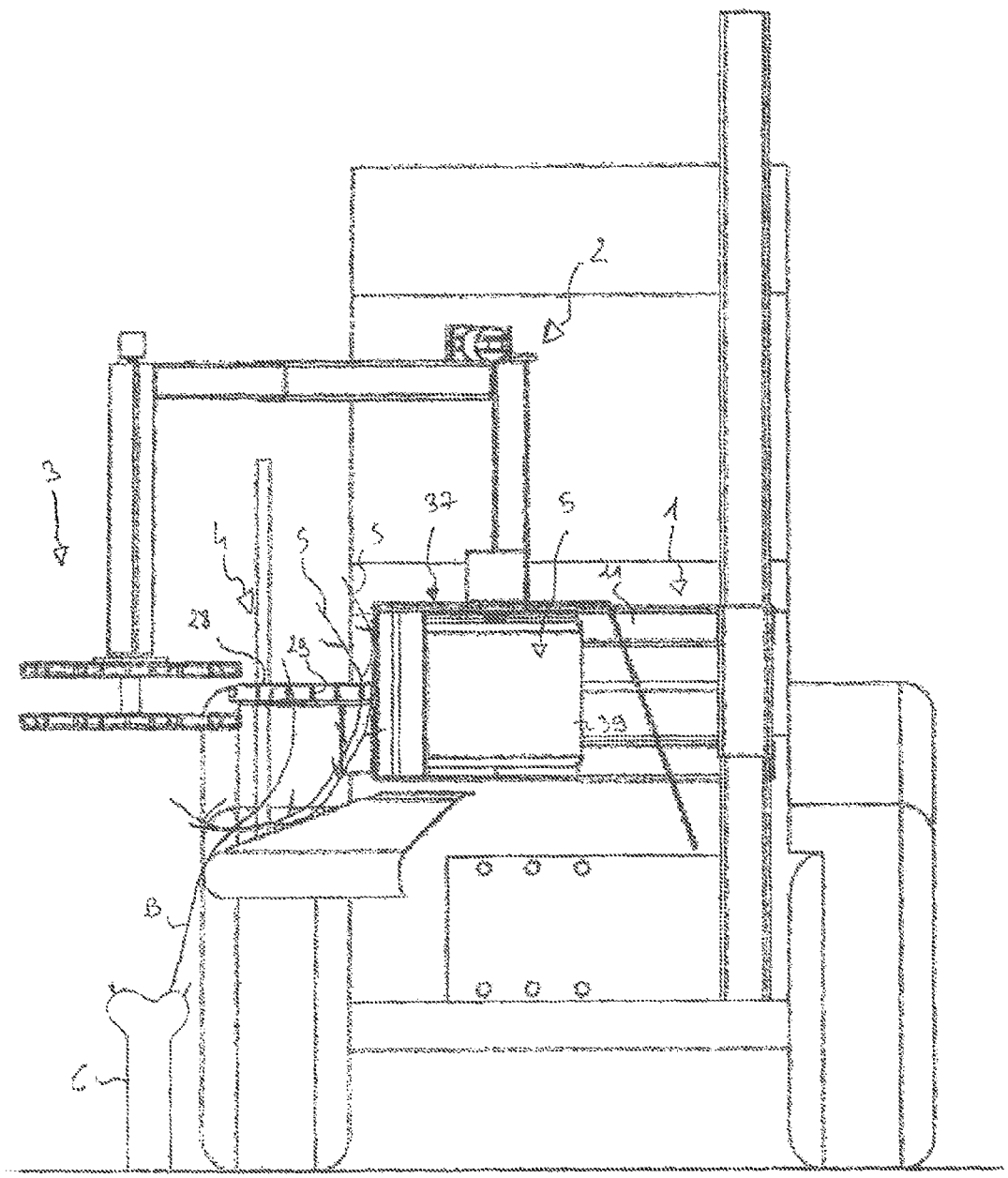
FIGS. 10 and 11 are views similar to FIGS. 6 and 7 showing the cut-off branches, still hanging on the tying wires, as they pass from the transfer device to the detaching device for the cut-off branches.
Figure 11:
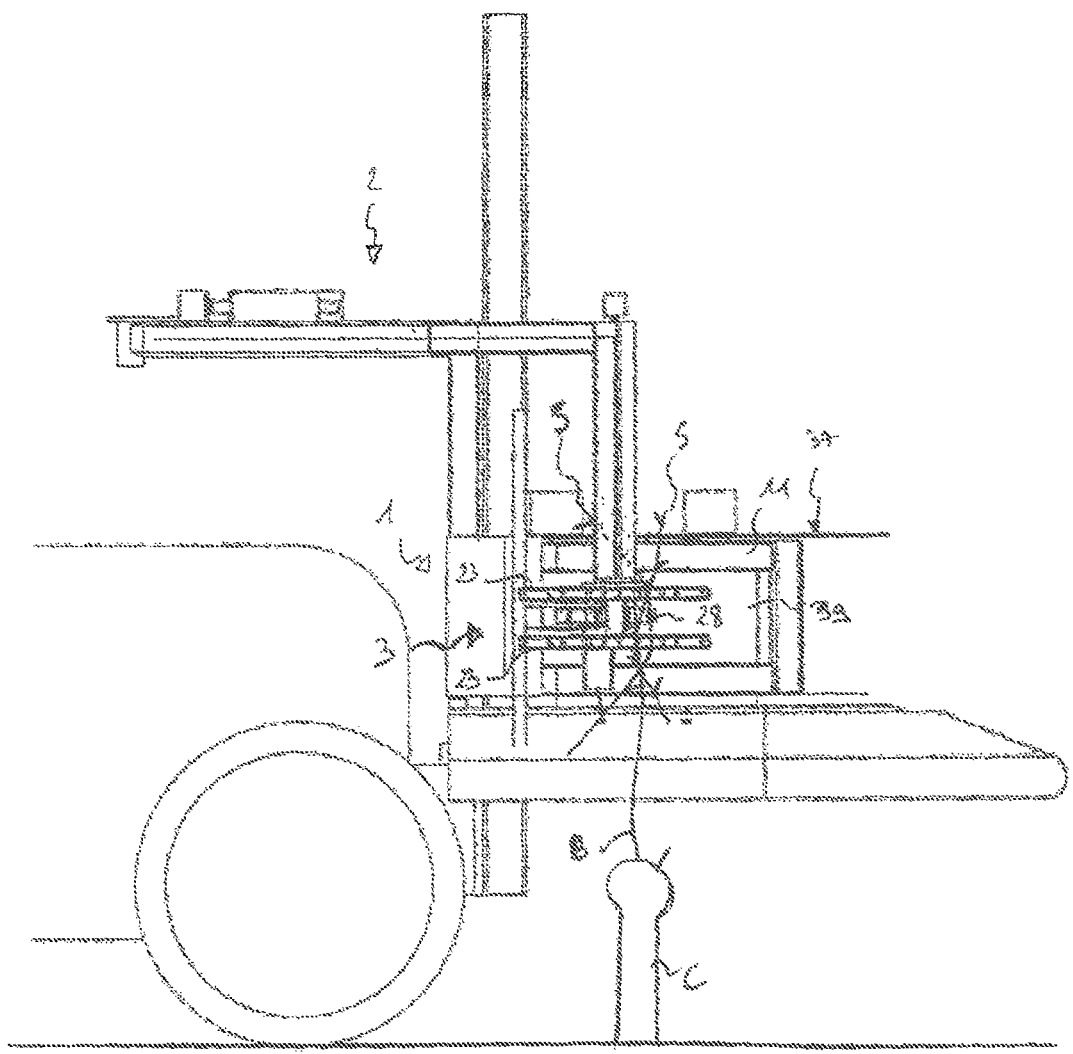

FIGS. 10 and 11 show the cut-off branches S after having been dragged partly inside of protection cover 37, the canalizing metal sheets 26 preventing them from escaping upwards or downwards.

It can be seen that the high sections of the cut-off branches S are bent downwards by horizontal slide 11 and that, when a part of the cut-off branches S arrives close to timing wheel 26, this part is directly captured between the tires 39 as the trajectory of projections 29 intersects the circumference of tires 39 of wheels 33 and 34 when they are projected on a same horizontal plane. As indicated above, the tires 39 are compressed against each other and are counter-rotating, so that the cut-off branches S are pulled towards the other side of the machine, opposite to tying wire F to which they are attached by their tendrils, with a traction force higher than the resistance of the tendrils.

Figure 12:
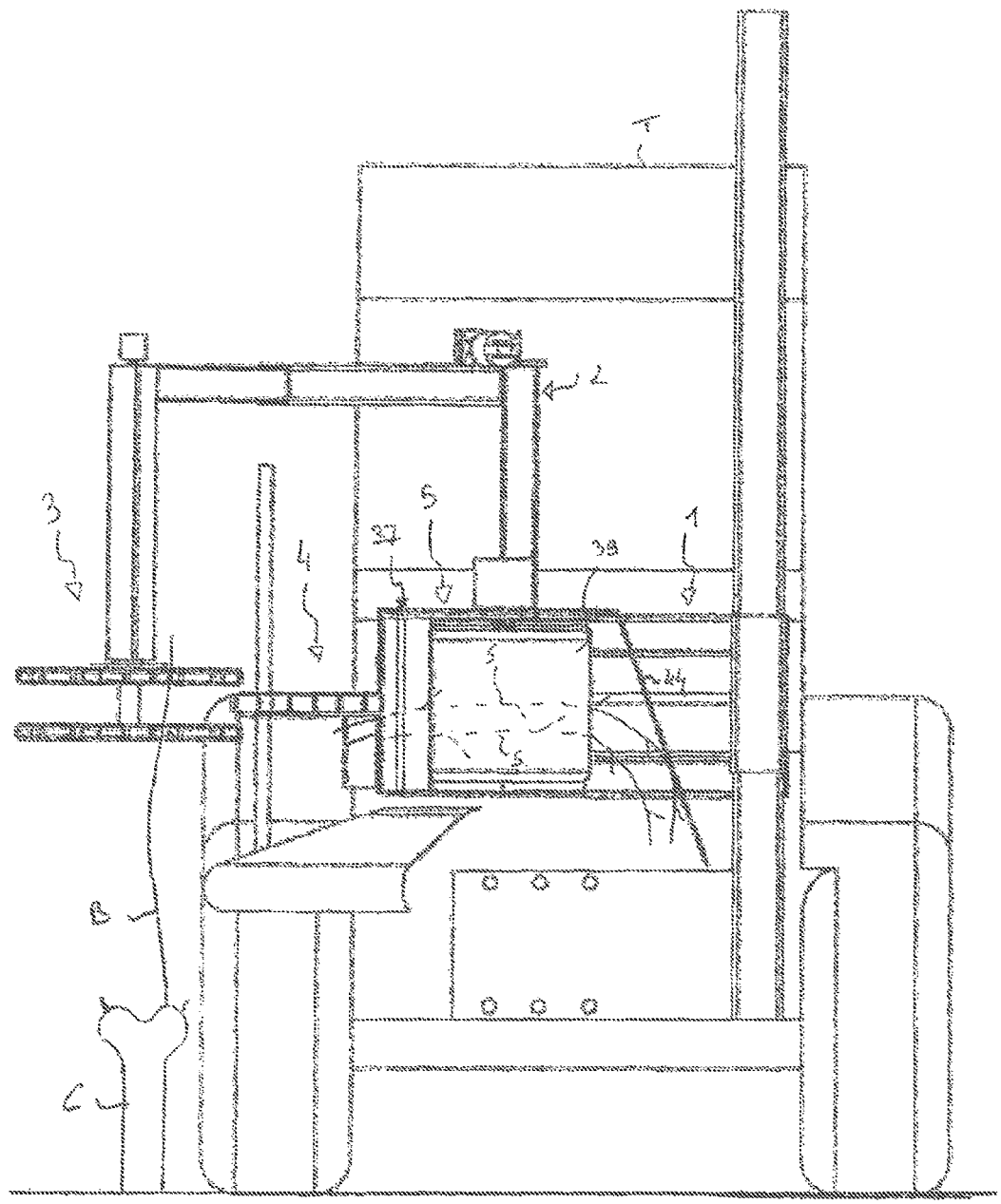
FIGS. 12 and 13 are views similar to FIGS. 6 and 7 showing the cut-off branches as they are detached from the tying wires by the detaching device.
Figure 13:
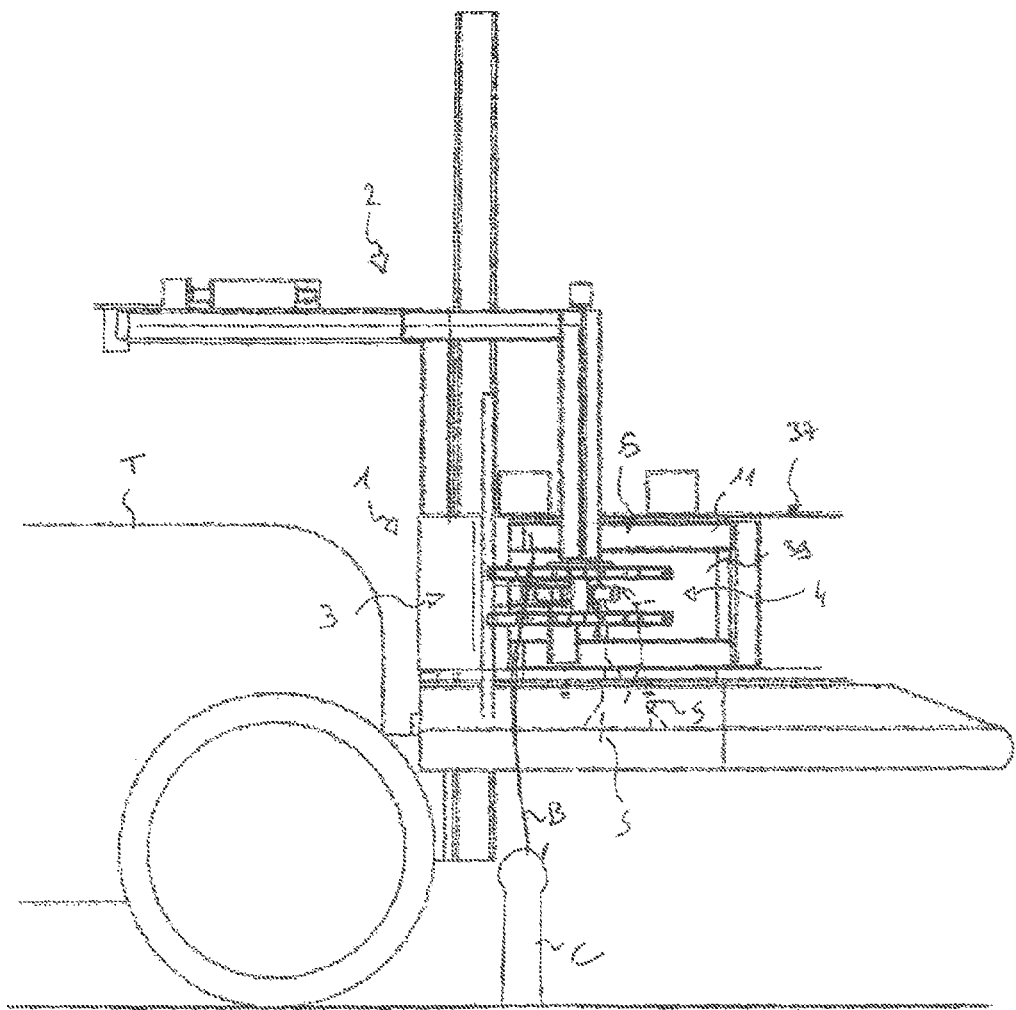

The cut-off branches are therefore detached by the action of the tires 39 and evacuated towards the other side of the machine, as shown in FIGS. 12 and 13.

Figure 14:
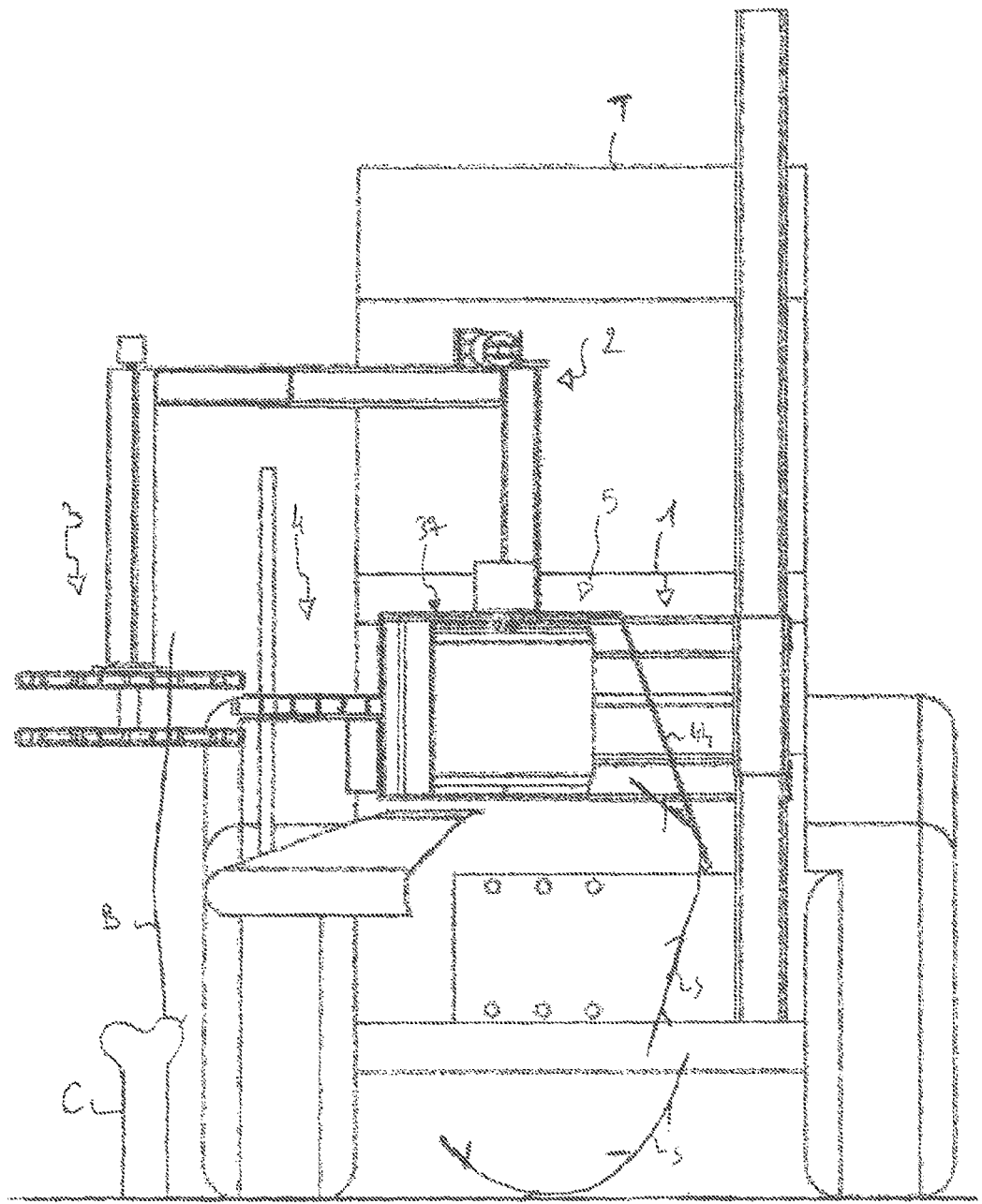
FIGS. 14 and 15 are views similar to views 6 and 7 showing the branches as they are ejected out of the detaching device.
Figure 15:
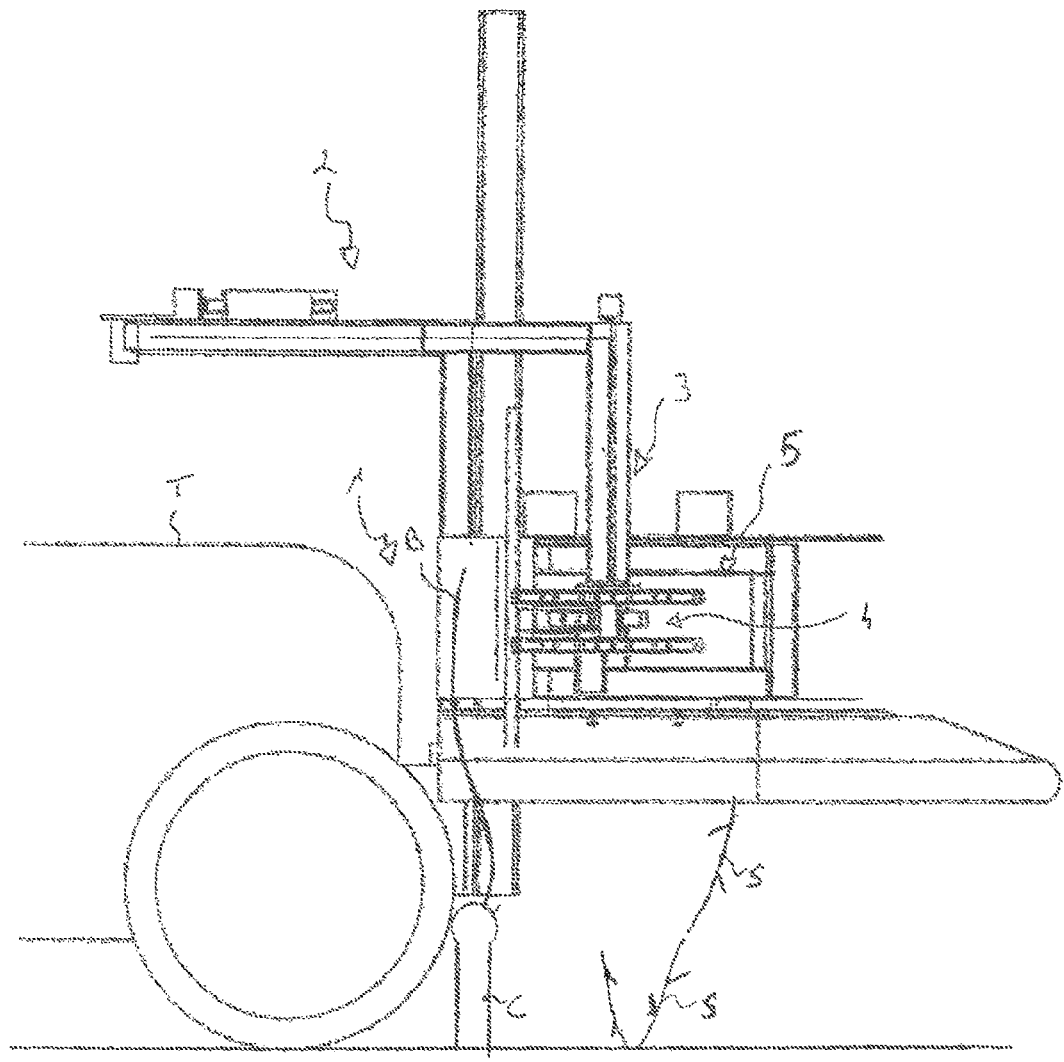

These Figures show in particular that the detached cut-off branches S are guided downwards by inclined metal sheet 44 in order to fall on the ground between the wheels of tractor T, so as to be subsequently shredded by the shredder, as shown in FIGS. 14 and 15.

The various steps of detaching cut-off branches S from a vine plant C have been described. As stated above, posts P are planted along the vine rows. The various steps performed by gripping disks 23 to move around these posts P will now be described in reference to FIGS. 16, 17 and 18.

Figure 16:
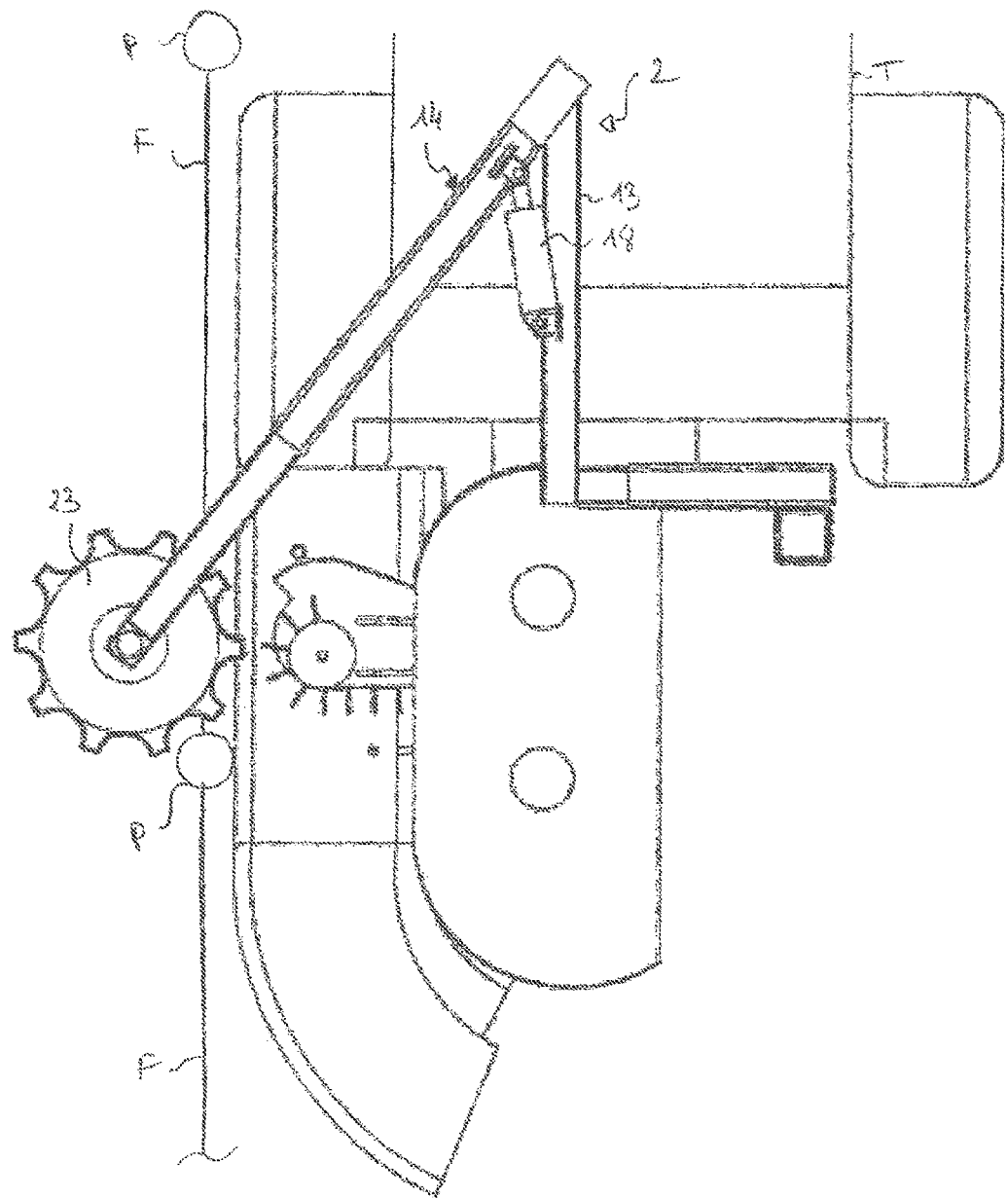
FIGS. 16, 17, 18 are top views of the machine according to the present invention, respectively in the normal operating position lust before the gripping disks enter in contact with a post of the vine row, in the position as the gripping disks pass round the post and in a position as the gripping disks have passed round the post and return to the normal operating position.

Referring first of all to FIG. 16, it can be seen that the machine is represented just before gripping disks 23 hit a post P as they still are in their normal operating position. In this position, the rod of cylinder 18 is retracted in the cylinder body and the angle between first arm 13 and second arm 14 is minimal, gantry 2 being in its closed position.

Figure 17:
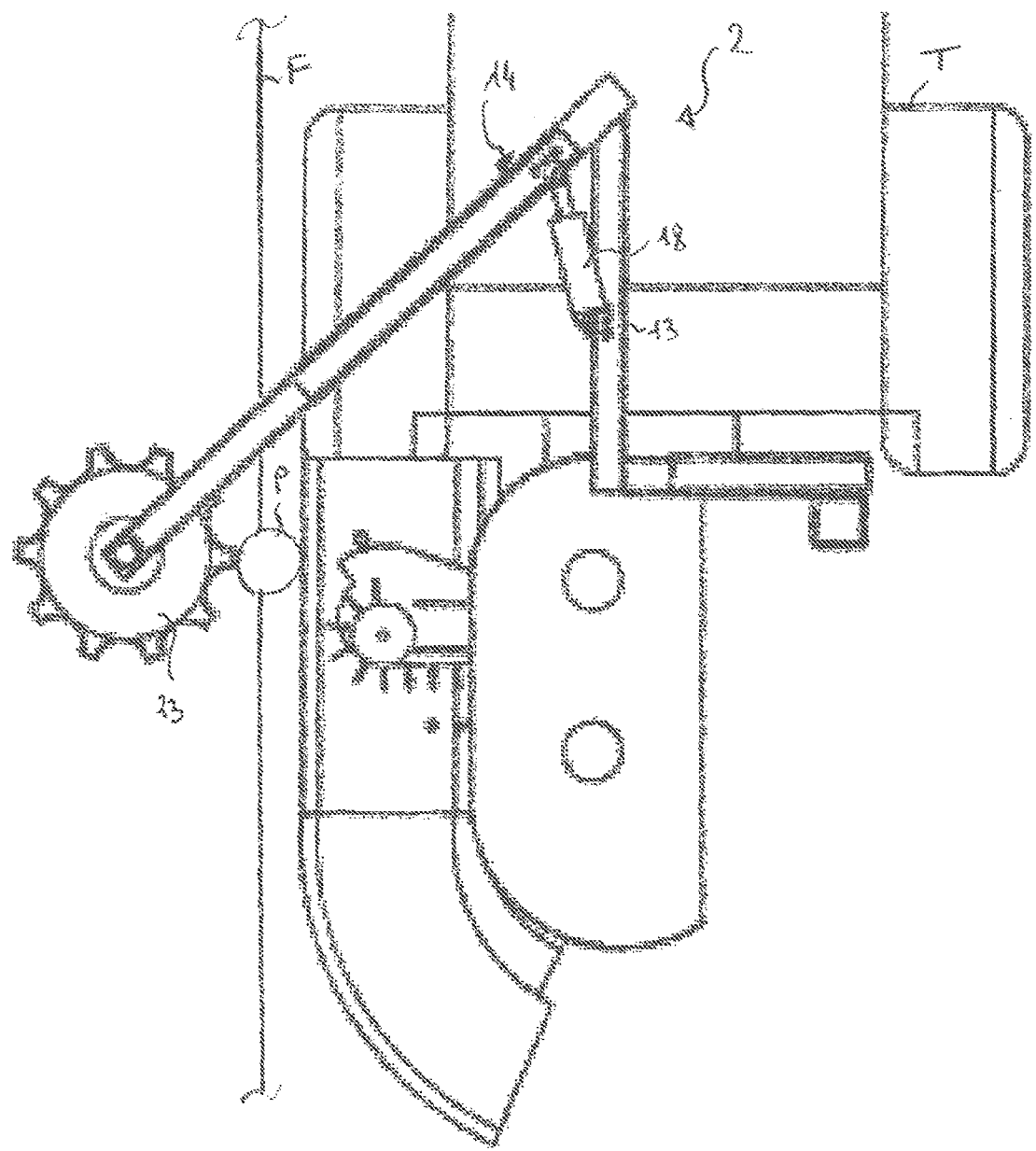

If the tractor T advances, the section of gripping disks 23 that is oriented towards tractor T will hit the section of post P that is turned opposite to tractor T, therefore moving gripping disks 23 away from tractor T and moving second arm 14 away from first arm 13, against the action of cylinder 18, thus opening slightly gantry 2, as shown in FIG. 17.

Figure 18:
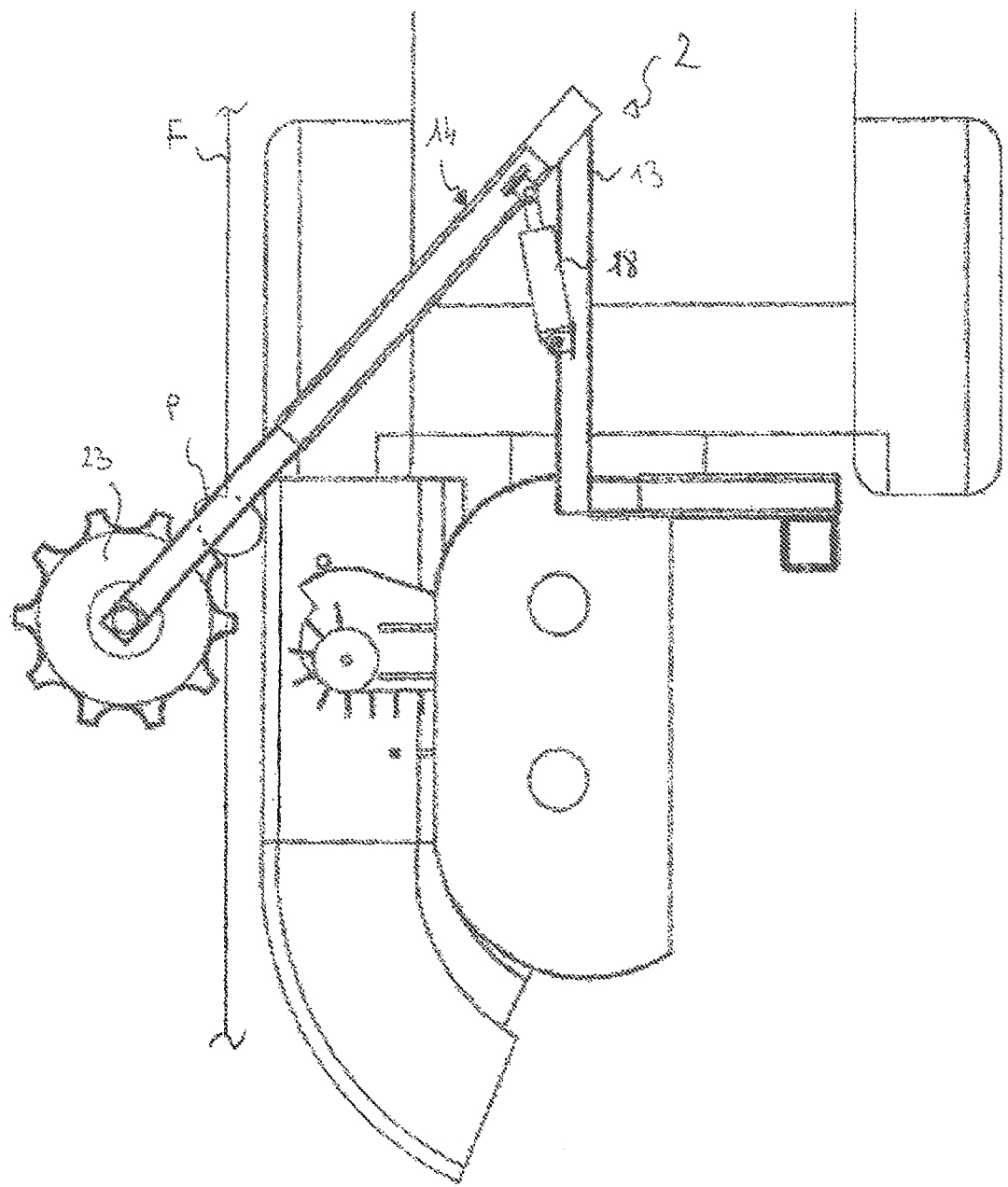

If the tractor T continues advancing, the gripping disks 23 will roll on the outside of post P and be brought back to their normal operating position by the action of cylinder 18, which tends to close gantry 2, as shown in FIG. 18.

Therefore, the machine according to the present invention allows detaching automatically all cut-off branches S of a vine row, leaving the long fruit-bearing branches B intact on vine plants C.

The structure of gantry 2 also allows the machine to go over from one vine row to the adjacent row with a single turn of tractor T, which is particularly convenient and fast.

In fact, the vine rows are often separated by a distance that is lust sufficient for the passage of a tractor T.

Figure 19:
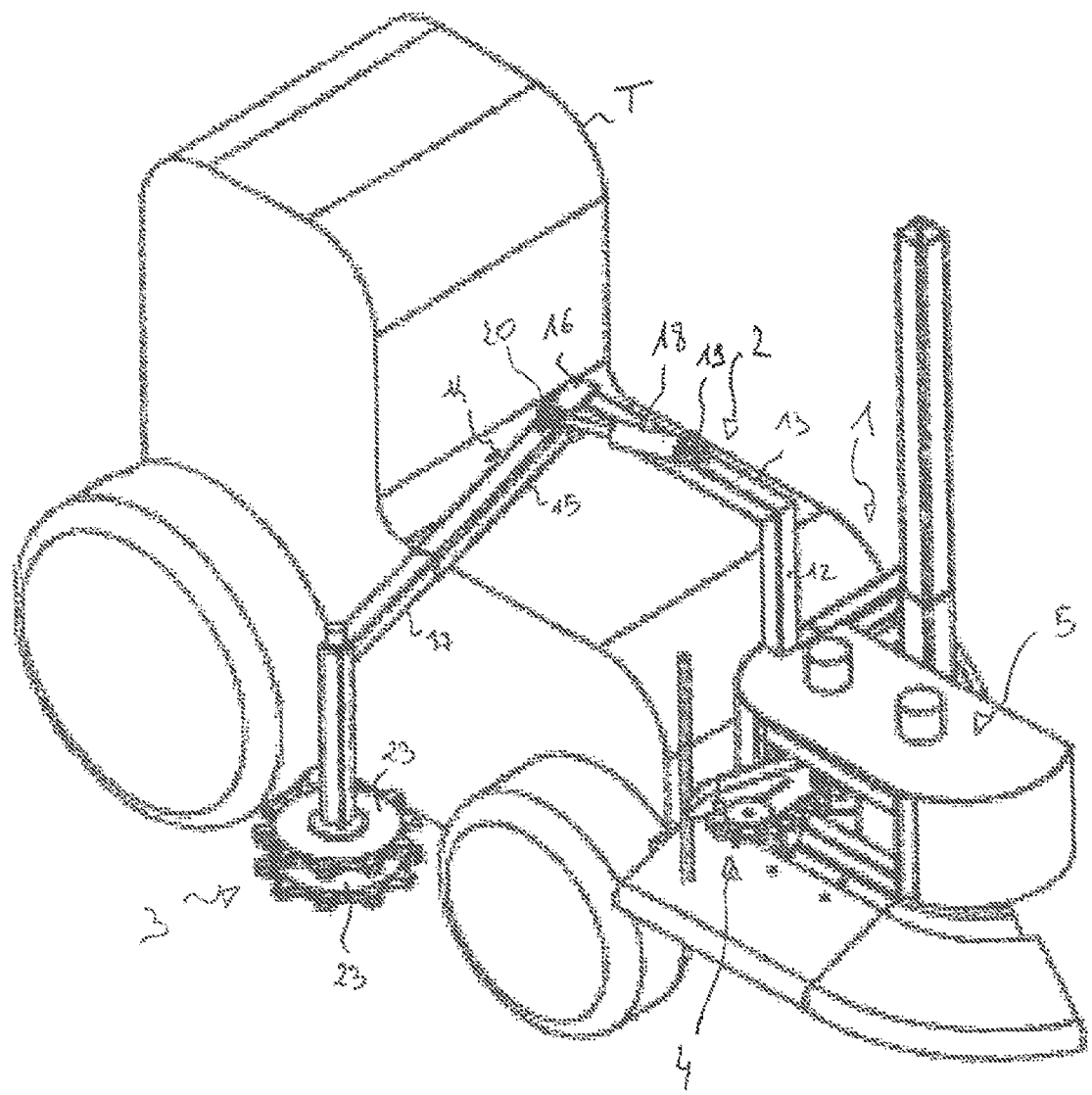
FIG. 19 is a perspective top view of the machine according to the present invention, in the position to enter or leave a vine row, in which the opening of the gantry is at its maximum.

So, when entering and leaving the vine row, the opening of gantry 2 is controlled by cylinder 18 to move second arm 14 at the maximum away from first arm 13, as shown in FIG. 19.

Once in this position, tractor T exits the corridor defined by the two consecutive vine rows in which it was, and it simultaneously turns to the right to enter, not in the first adjacent corridor defined by the processed vine row and the vine row to be processed that is immediately adjacent on the right, but in the following corridor, that is to say the one defined by the vine row to be processed and the vine row adjacent to the latter. During this curve, the gripping disks 23 remain in the first corridor and form a fictive rotation point around which tractor T turns.

Figure 20:
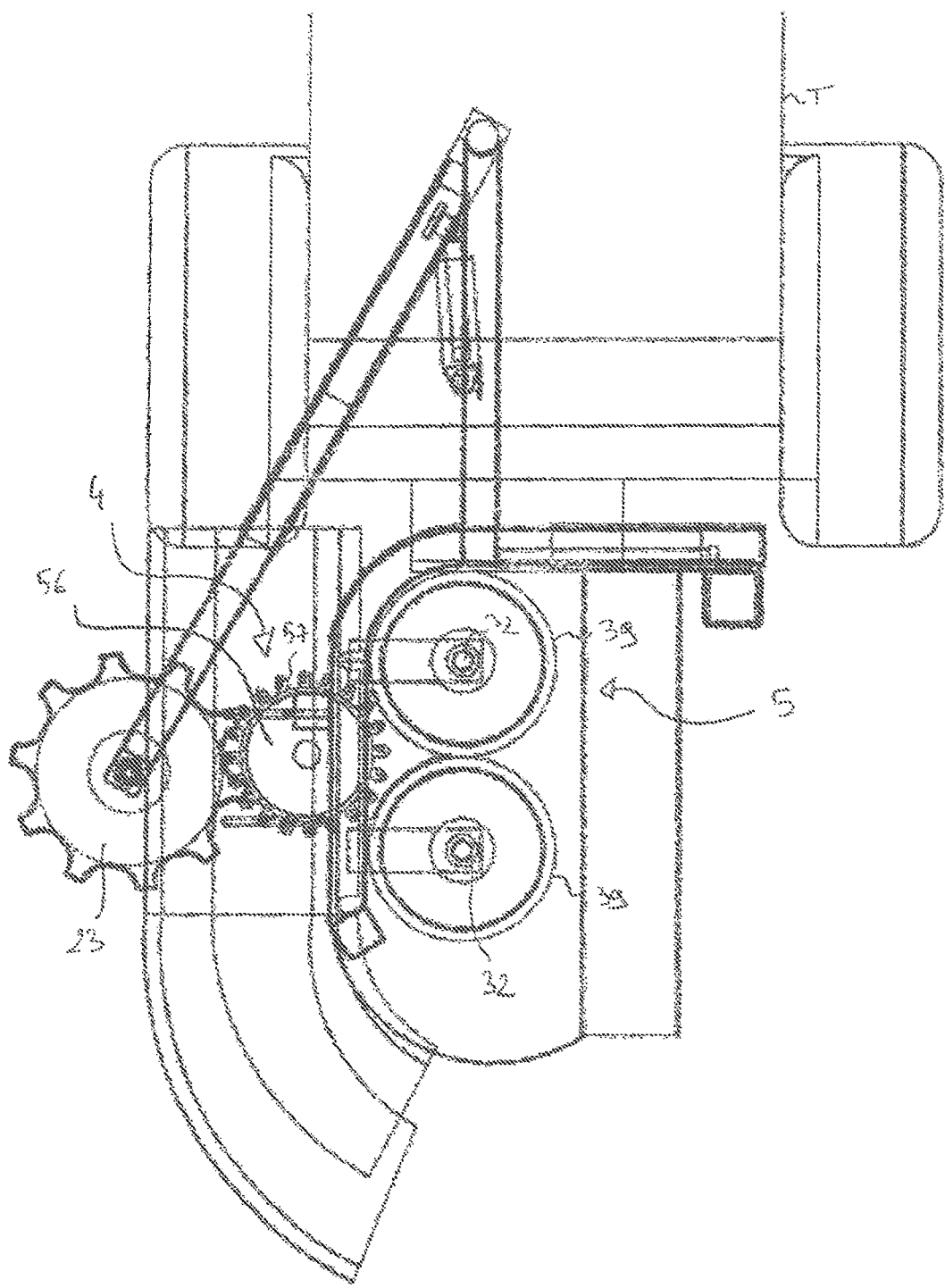
FIGS. 20 and 21 are respectively top and front views of the machine according to a variant of the present invention.
Figure 21:
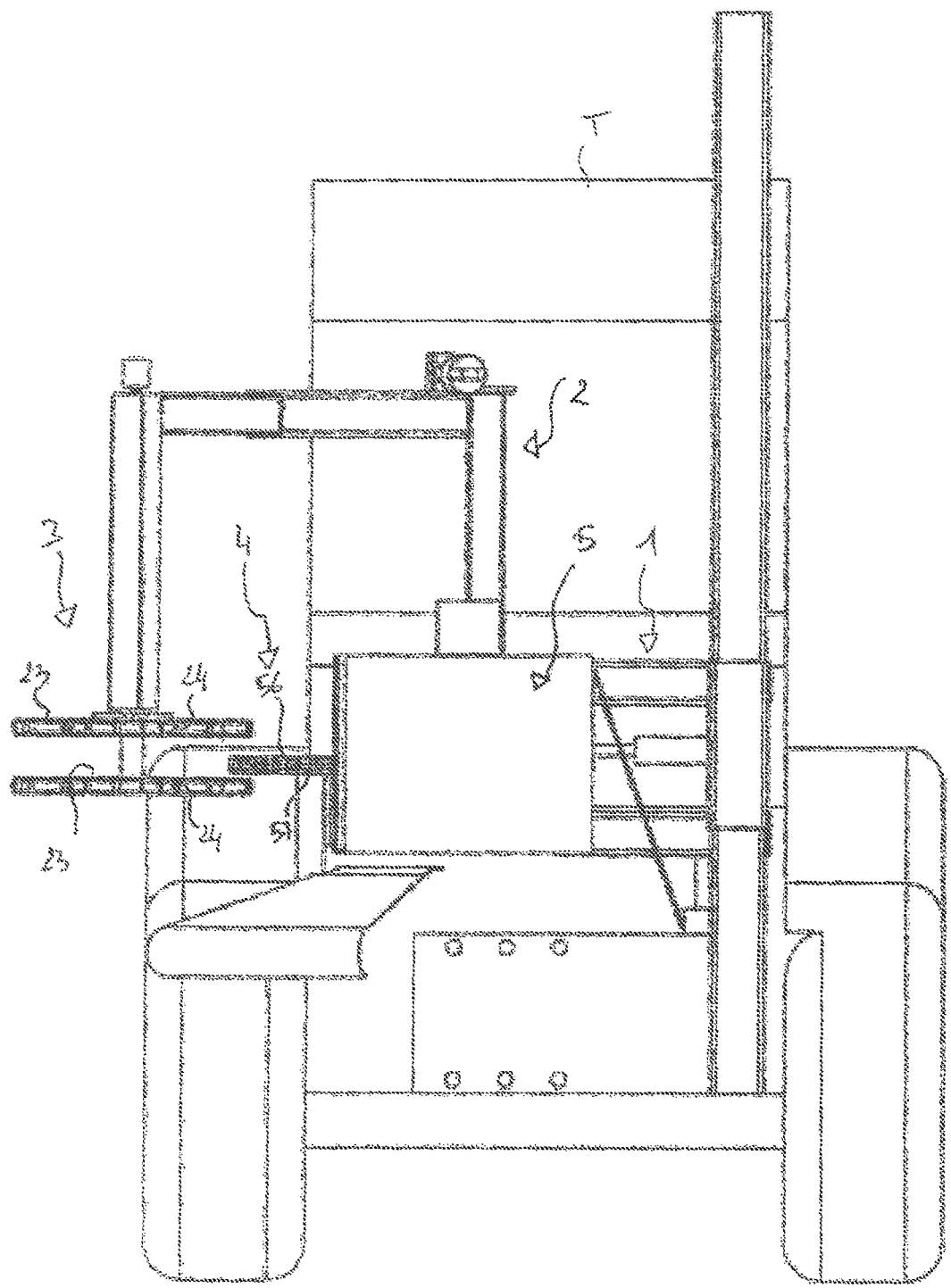

Referring now to FIGS. 20 and 21, it can be noted that they represent a variant of the above-described machine.

The differences lie in the device 4 for transferring the cut-off branches and in the device 5 for detaching them.

In the represented variant, the transfer device 4 comprises a toothed wheel 56 whose teeth 57 are spaced from each other and dimensioned in order to form spaces having the same function of dragging the cut-off branches S and letting the long fruit-bearing branches B slide as transfer belt 28.

In detaching device 5, the first drive shaft 32 carries only one tire 39 identical to the tire 39 carried by the second drive shaft 32.

The diameter of toothed wheel 56 is chosen so that the projections of the circumferences of toothed wheel 56 and of gripping disks 23 on a same horizontal plane intersect in the same way as described above for transfer belt 28, and so that toothed wheel 56 is located near the treads of tires 39.

The toothed wheel 56 is carried by a shaft and bearings and is driven in rotation by a hydraulic motor.

A guide is also provided, having the shape of a set of fingers and serving to guide the cut-off branches S when they are introduced inside of protection cover 37.

The operation of the machine according to this variant is identical to that described above, the cut-off branches S and the long fruit-bearing branches B being first of all gripped by gripping disks 23, then transferred to toothed wheel 56, which introduces the cut-off branches S inside of protection cover 37, letting the long fruit-bearing branches B slide, while the cut-off branches S are captured and detached from tying wire F by tires 39, and ejected out of the machine to be ground by the shredder.

Figure 22:
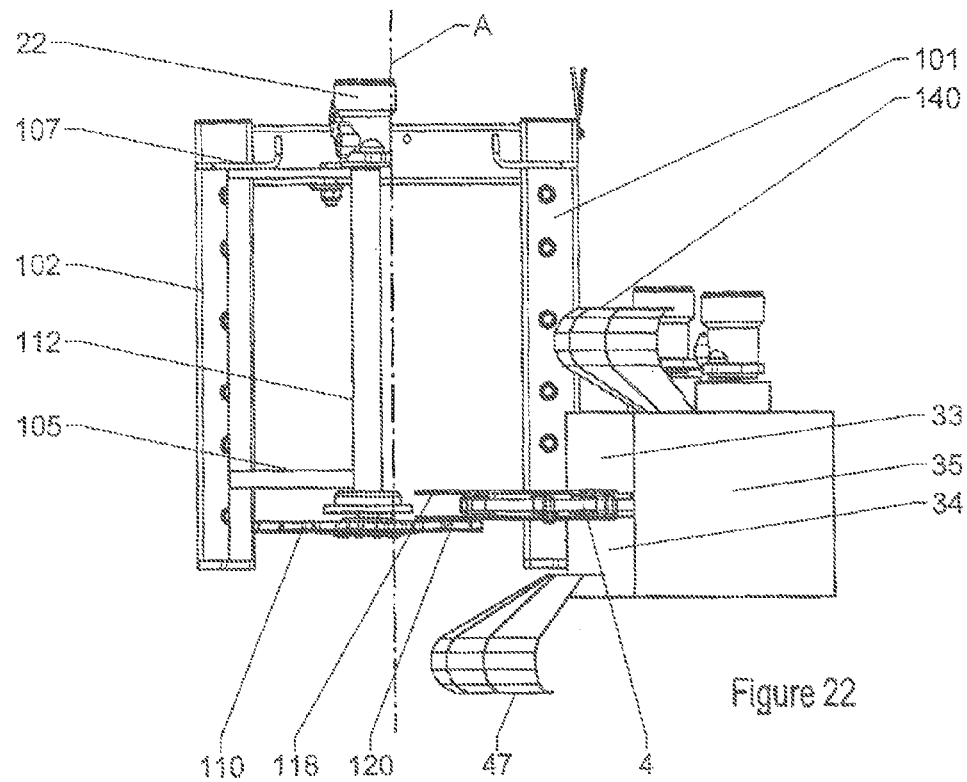
FIGS. 22 to 24 represent another variant of the machine with partial front, perspective and top views.
Figure 23:
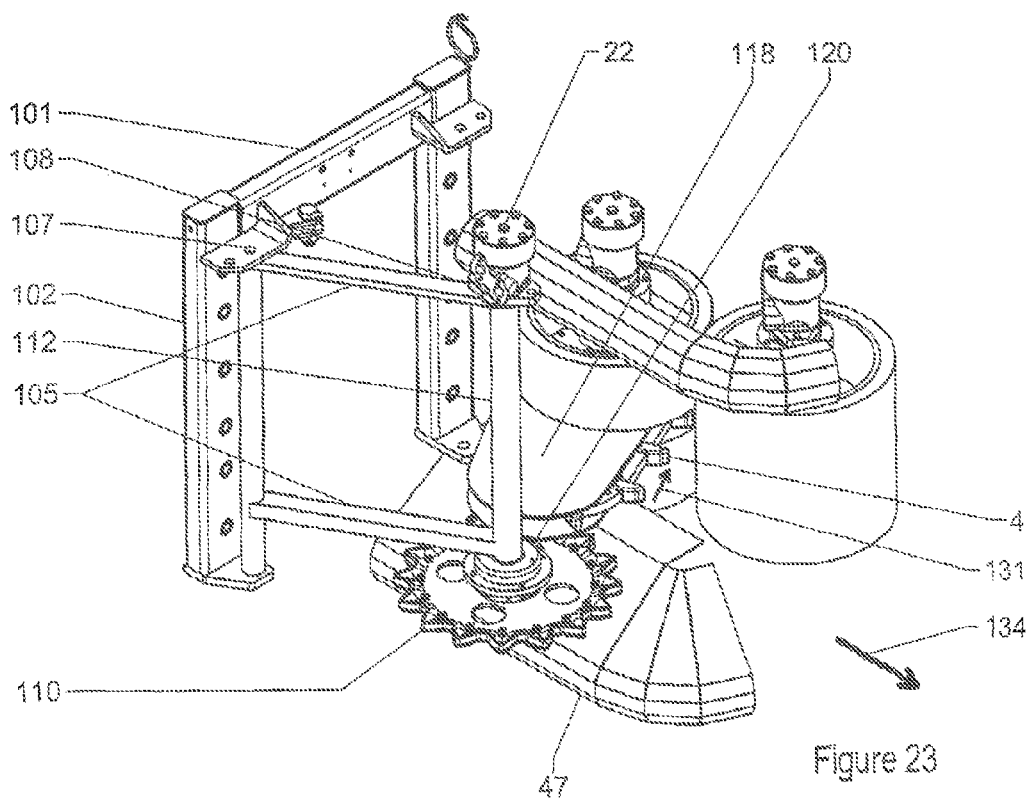
Figure 24:
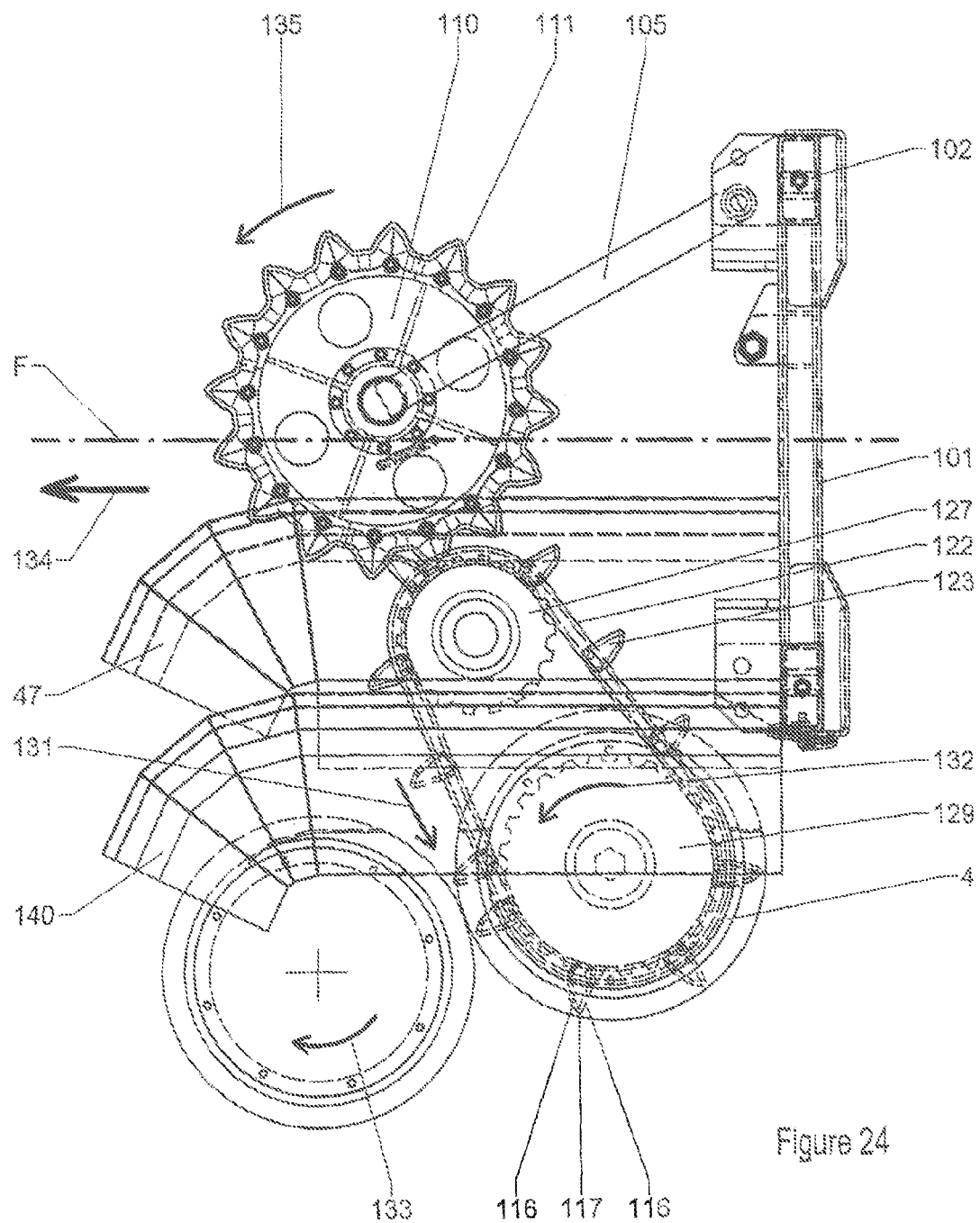

A second variant of the machine according to the invention will now be described in reference to FIGS. 22 to 24. Only the modified part is shown in these figures.

A rigid gantry 101 is mounted besides the tractor instead of the arms 13, 14. As the tractor advances, the vine row passes through gantry 101, approximately and preferably along axis A, between a gripping disk 110 and transfer device 4. A swiveling frame 105 is connected to the most distant vertical arm 102, that is to say the arm away from the tractor. A cylinder extends between gantry 101 and frame 105; only its pivoting fastening devices 107, 108 are shown. In a way analog to cylinder 18 (FIG. 5), this cylinder exerts an adjustable pressure to:

maintain gripping disk 110 between tying wires F (see FIG. 1) so as to push the branches out of said tying wires towards transfer device 4;

allow disk 110 to move around the post as explained previously.

In the distal vertical beam 112 of frame 105, a motor 22 is connected to the upper end of the drive shaft of gripping disk 110.

It must be noted that, in comparison with the previous examples, this combination of a gantry and of a swiveling frame can easily be adapted for mounting on the right (as represented) or on the left of the tractor. According to this variant, there is only one gripping disk 110. The later has a specific peripheral toothing, similar to that of a gear. The flanks 116 of the teeth are slightly curved, the tips 117 are rounded. The thickness of the teeth is relatively important; according to the example, it is about 15 mm. This profile has the advantage of combining a certain aggressiveness that is just necessary and sufficient to ensure a good grip of the branches and allows disk 110 to move around the posts without damaging them. Above the gripping disk 110 and extending partially radially inside of said disk, a transfer device 4 is arranged, flanked by an upper plate 118 and a lower plate 120. These plates 118, 120 prevent the branches carried by gripping disk 110 from getting between chain 122 and toothed wheels 127, 129.

The transfer device comprises mobile elements consisting mainly of a chain 122 provided with claws 123, a toothed pulley 127 and a toothed chain wheel 129. Seen from above, the claws 123 have a shape similar to a tooth: their front profile is oriented mainly perpendicularly to chain 122, while their rear profile has a rather polygonal or rounded shape.

The chain 122 is guided by toothed pulley 127 mounted between the two protective plates 118, 120 and is driven by the rear driving toothed wheel 129.

Unlike the previous variants, the toothed wheel 129 is arranged with respect to the direction of travel. With this arrangement, in comparison with the variants described above, the branches are pulled beyond the contact area of the couple of coated wheels 33, 34 with wheel 35. The drive of chain 122 is simplified, as the toothed wheel 129 is firmly attached to the common shaft of wheels 33, 34 (see FIG. 24). Of course, the kinematic chain of all these mobile elements (wheels 34, 35 (arrow 132), wheel 33 (arrow 133), chain 122 (arrow 131)) are synchronous. In particular, the absolute values of the tangential components of the speeds of wheels 33, 34 and 35, which are reverse to one another, are identical, can be set and adjusted according to the density and length of the branches.

Finally, this variant is completed with at least one upper metal sheet guide 140 to improve the funnel effect of lower metal sheet guide 47.

In a different way, in the operating phase, the rotational speed of gripping disk 110 (arrow 135) is kept equal to that of the tractor (arrow 134) so that, mainly, the forces exerted by disk 110 on the posts are reduced to a minimum as it turns around them.

The coated wheels 33, 34, 35 have preferably each a cylindrical shape.

As a variant, the chain 122 can be replaced by a timing belt 28, the toothed pulley 127 and the toothed wheel 129 being then replaced with similar timing elements to ensure the drive of such belt 28.

It is well understood that the embodiments described above are given for information without limitation and that modifications can be made while remaining within the scope of the present invention.

What is claimed is:

1. A machine for automatically pulling out the cut-off vine branches that are hanging by their tendrils on a tying wire that connects vertical posts installed along a row of vine plants, each of the vine plants carrying a long fruit-bearing branch, the machine comprising:
   a device for gripping and dragging the cut-off vine branches and the long fruit-bearing branches, the device including a circular element that rotates around a vertical shaft, extends in a horizontal plane, and has gripping notches on its circumferential surface for gripping and dragging the cut-off vine branches and the long fruit-bearing branches;
   a transfer device including a transfer element having transfer notches, a trajectory of the transfer notches intersecting a trajectory of the gripping notches at an inlet of the transfer device, thereby allowing the transfer device to move the cut-off vine branches and the long fruit-bearing branches from the gripping notches and to drag the cut-off vine branches to an outlet of the transfer device; and
   a device for detaching the cut-off vine branches from the tying wire, the device including a capture device configured to capture the cut-off vine branches and to exert a traction force generally higher than the resistance of the tendrils that attach the cut-off vine branches to the tying wire, the trajectory of the transfer notches intersecting a periphery of the detaching device so that the capture device can catch the cut-off vine branches dragged by the transfer device,
   wherein the gripping and the transfer notches are formed so that the long fruit-bearing branches are not torn off the vine plants, and the gripping and the transfer notches are formed to permit the long fruit-bearing branches to slide away from the gripping and the transfer notches so that the long fruit-bearing branches do not reach the intersection between the trajectory of the transfer notches and the periphery of the detaching device.

2. The machine according to claim 1, wherein the circular element comprises at least one gripping disk and the gripping notches are located on a periphery of the least one gripping disk delimited by teeth able to drag the cut-off vine branches.

3. The machine according to claim 2, wherein the at least one gripping disk is arranged so as to allow the at least one gripping disk a movement under the influence of a return element, giving the at least one gripping disk the ability to move around a post of the vertical posts.

4. The machine according to claim 3, wherein the transfer device includes:
   at least one wheel having the transfer notches on its periphery, a drive configured for driving the at least one wheel in a direction opposite to that of the at least one gripping disk at the intersection of the trajectory of the gripping notches and the trajectory of the transfer notches; or
   a movement transmission device provided with projections defining the transfer notches between them, the movement transmission device being driven in a direction opposite to that of the at least one gripping disk at the intersection of the trajectory of the gripping notches and the trajectory of the transfer notches.

5. The machine according to claim 4, wherein the detaching device includes two rotary bodies in contact with each other in an area, the contact area forming the section exerting the traction force, the rotary bodies being driven in rotation so that their surfaces in the contact area move at the same speed and in the same direction, and a driving wheel is integrated in one of the two rotary bodies, around which the movement transmission device of the transfer device extends in order to drive it.

6. The machine according to claim 4, wherein the movement transmission device of the transfer device comprises a chain, and the projections are claws, the chain carrying the claws.

7. The machine according to claim 1, further comprising a guiding device, provided above the transfer device, below the transfer device, or above and below the transfer device, configured for forming an inclined surface in order to achieve a funnel effect for the cut-off vine branches dragged by the transfer device.

8. The machine according to claim 1, configured to be coupled to the front of an agricultural vehicle and further comprising:
   a supporting frame comprising a device for attaching the supporting frame to the agricultural vehicle, the supporting frame extending in longitudinal and transverse directions that correspond, once the supporting frame is attached to the agricultural vehicle, respectively to the direction along which the vine row extends and to the direction transverse to the latter direction; and
   a gantry attached to the supporting frame and including at least two arms mounted so as to pivot about the supporting frame, in the transverse direction;
   wherein the device for gripping and dragging the cut-off vine branches and the long fruit-bearing branches comprises:
      a vertical drive shaft rotatably connected to an overhanging end region of the gantry,
      at least one gripping disk fixedly mounted on the vertical drive shaft and having on its circumferential surface the gripping notches for gripping and dragging the cut-off vine branches and the long fruit-bearing branches, and
      a motor connected to the vertical drive shaft and rotating the vertical drive shaft in a direction that drags the cut-off vine branches and the long fruit-bearing branches gripped by the at least one gripping disk towards the supporting frame;
   wherein the transfer element is rotatably connected to the supporting frame and has the transfer notches on an outside of the transfer element for gripping and dragging the cut-off vine branches gripped by the at least one gripping disk, and the transfer device has a drive for driving the transfer element in rotation, and arranged so as to rotate the transfer element in a direction of rotation opposite to a direction of rotation of the at least one gripping disk; and wherein the device for detaching the cut-off vine branches is arranged at the outlet of the transfer device and the capture device pulls the cut-off vine branches in a direction opposite to a direction of the transfer device relative to the detaching device.

9. The machine according to claim 1, wherein the device for gripping and dragging the cut-off vine branches and the long fruit-bearing branches comprises two gripping disks distant from each other, a section of the transfer element extending between the two gripping disks.

10. The machine according to claim 1, wherein the transfer element comprises a belt having on its external surface projections distributed along the length of the belt and spaced from each other so that the space between two consecutive projections forms one of the transfer notches for gripping and dragging the cut-off vine branches.

11. The machine according to claim 1, wherein the transfer element comprises a wheel with external toothing, the teeth being dimensioned so that the space between two successive teeth forms one of the transfer notches for gripping and dragging the cut-off vine branches.

12. The machine according to claim 8, wherein the capture device comprises:
   two wheel sets arranged at the outlet of the transfer device and rotatably carried by the supporting frame so that their rotation axes are parallel and preferably vertical, and so that the circumferential surfaces of the two wheel sets are pressed against each other, and
   a device for driving the wheel sets in rotation, arranged to make the wheel sets turn in directions that are opposite to each other and so that the wheel sets pull the cut-off vine branches between the circumferential surfaces of the two wheel sets to a side opposite to a side of the transfer device.

13. The machine according to claim 12, wherein the rotation axes of the wheel sets are vertical and the wheel sets are arranged in the longitudinal direction of the supporting frame, wherein the wheel set closest to the attaching device of the supporting frame on the agricultural vehicle comprises two wheels distant from each other and having circumferential surfaces pressed against the circumferential surface of the other wheel set, the transfer element being arranged with respect to the supporting frame so that the transfer element extends in the space between the two wheels and the cut-off vine branches leave the transfer notches of the transfer element in the plane generated by the transverse direction of the supporting frame and the contact line between the two wheel sets.

14. The machine according to claim 12, wherein the circumferential surface of the wheel sets is structured.

15. The machine according to claim 8, wherein the gantry comprises a vertical gantry mast attached to the supporting frame, a first arm attached perpendicularly to the upper part of the gantry mast and extending in the longitudinal direction of the supporting frame, on the side opposite to the transfer device and to the detaching device, a second arm attached to the first arm so as to swivel and extending in overhang from the supporting frame, and a device for controlling the swiveling of the second arm with respect to the first arm, the gripping device being attached to the end region of the second overhanging arm of the supporting frame.

16. The machine according to claim 8, wherein the at least two arms of the gantry are telescopic to allow adjustment of the distance of the overhang of an end of the at least two arms of the gantry with respect to the supporting frame.

17. The machine according to claim 8, wherein the supporting frame comprises a mounting plate for the agricultural vehicle, a vertical mast attached to the mounting plat, a mobile frame including a vertical slide mounted so as to move vertically on the vertical mast, and a device for controlling the movement of the vertical slide, the gantry being attached to the mobile frame.

18. The machine according to claim 17, wherein the mobile frame further comprises at least one beam forming a slide attached horizontally to the vertical slide and in the transverse direction of the supporting frame, at least one horizontal slide mounted so as to move in the at least one beam forming the slide, and a further device for controlling the movement of the at least one horizontal slide, the gantry, the transfer device, and the detaching device, the further device being attached to the at least one horizontal slide.

19. The machine according to claim 18, wherein a sheet metal guide is attached to the at least one horizontal slide, and the sheet metal guide extends downwards and opposite to the supporting frame, the sheet metal guide serving as a resting surface for lower sections of the cut-off vine branches when they are dragged by the at least one gripping disk and the transfer element, to bend them upwards so as to release them from the tying wire that connects the vertical posts.

20. An agricultural vehicle equipped with the machine as defined in claim 1.

* * * * *